United States Patent
Miyata et al.

(10) Patent No.: US 12,214,578 B2
(45) Date of Patent: Feb. 4, 2025

(54) TRANSFER SHEET AND MANUFACTURING METHOD FOR SAME, METHOD FOR MANUFACTURING MOLDED BODY USING SAID TRANSFER SHEET AND MOLDED BODY, AND FRONT PLATE USING SAID MOLDED BODY AND IMAGE DISPLAY DEVICE

(71) Applicant: DAI NIPPON PRINTING CO., LTD., Tokyo (JP)

(72) Inventors: Ryohei Miyata, Neyagawa (JP); Kiyotaka Matsui, Nagareyama (JP); Yoshinari Matsuda, Okayama (JP); Jun Ueda, Mihara (JP); Seiji Shinohara, Tokyo (JP); Tomoyuki Horio, Tsukuba (JP); Tatsuya Kozakai, Okayama (JP); Sho Suzuki, Sendai (JP)

(73) Assignee: DAI NIPPON PRINTING CO., LTD., Tokyo (JP)

(*) Notice: Subject to any disclaimer, the term of this patent is extended or adjusted under 35 U.S.C. 154(b) by 597 days.

(21) Appl. No.: 17/599,418

(22) PCT Filed: Mar. 27, 2020

(86) PCT No.: PCT/JP2020/013996
§ 371 (c)(1),
(2) Date: Nov. 10, 2021

(87) PCT Pub. No.: WO2020/203759
PCT Pub. Date: Oct. 8, 2020

(65) Prior Publication Data
US 2022/0184937 A1    Jun. 16, 2022

(30) Foreign Application Priority Data
Mar. 29, 2019  (JP) .................. 2019-067720

(51) Int. Cl.
*B32B 37/24*    (2006.01)
*B32B 7/06*    (2019.01)
(Continued)

(52) U.S. Cl.
CPC .............. *B32B 37/24* (2013.01); *B32B 7/06* (2013.01); *B44C 1/1708* (2013.01); *G02B 1/02* (2013.01); *G02B 1/18* (2015.01); *B32B 2037/243* (2013.01); *B32B 2457/202* (2013.01); *G02F 1/133331* (2021.01)

(58) Field of Classification Search
CPC ..... B32B 37/24; B32B 7/06; B32B 2037/243; B32B 2457/202; B32B 37/025;
(Continued)

(56) References Cited

U.S. PATENT DOCUMENTS 9,046,645 B2    6/2015  Hayashi et al.
2012/0267042 A1  10/2012  Okafuji et al.
(Continued)

FOREIGN PATENT DOCUMENTS

CN    102648091    8/2012
CN    103765249    4/2014
(Continued)

OTHER PUBLICATIONS

Machine translation of WO 2004/113966 A1. (Year: 2004).*
(Continued)

*Primary Examiner* — Patricia L. Nordmeyer
(74) *Attorney, Agent, or Firm* — HSML P.C.

(57) ABSTRACT

Provided is a method for manufacturing a transfer sheet which can impart a sufficient function to an adherend. The method for manufacturing a transfer sheet includes performing the following steps (1) and (2) in order: (1) applying a coating liquid for forming a transfer layer onto a release substrate 1 to form a transfer layer comprising at least one functional layer; and (2) laminating a release substrate 2
(Continued)

onto the transfer layer to obtain a transfer sheet A comprising the release substrate 1, the transfer layer and the release substrate 2 in the presented order and having a peel strength 2 between the release substrate 2 and the transfer layer larger than a peel strength 1 between the release substrate 1 and the transfer layer.

7 Claims, 4 Drawing Sheets

(51) Int. Cl.
  *B44C 1/17* (2006.01)
  *G02B 1/02* (2006.01)
  *G02B 1/18* (2015.01)
  *G02F 1/1333* (2006.01)
(58) Field of Classification Search
  CPC ... B44C 1/1708; B44C 1/1725; B44C 1/1712; B44C 1/17; G02B 1/02; G02B 1/18; G02B 1/111; G02B 5/0242; G02F 1/133331
  See application file for complete search history.

(56) References Cited

U.S. PATENT DOCUMENTS

| | | |
|---|---|---|
| 2013/0340930 A1 | 12/2013 | Chevallier et al. |
| 2016/0039188 A1 | 2/2016 | Namikawa |
| 2017/0313911 A1 | 11/2017 | Fukuda et al. |
| 2018/0231688 A1 | 8/2018 | Byun et al. |
| 2020/0217991 A1 | 7/2020 | Byun et al. |
| 2020/0384747 A1 | 12/2020 | Fukuda et al. |

FOREIGN PATENT DOCUMENTS

| | | | |
|---|---|---|---|
| CN | 105142925 | 12/2015 | |
| CN | 107000419 | 8/2017 | |
| CN | 107360718 | 11/2017 | |
| JP | 2002-082205 | 3/2002 | |
| JP | 2003-177241 | 6/2003 | |
| JP | 2006-163082 | 6/2006 | |
| JP | 2008-151930 | 7/2008 | |
| JP | 2008-162260 | 7/2008 | |
| JP | 2009-056674 | 3/2009 | |
| JP | 2009-072954 | 4/2009 | |
| JP | 2011-149010 | 8/2011 | |
| JP | 2012-207166 | 10/2012 | |
| JP | 2014-130298 | 7/2014 | |
| JP | 2019-048426 | 3/2019 | |
| WO | WO-2004113966 A1 * | 12/2004 | ............ G02B 1/111 |
| WO | 2009/133697 | 11/2009 | |

OTHER PUBLICATIONS

International Search Report of PCT/JP2020/013996, Jun. 30, 2020, 7 pages including English translation.

The extended European Search Report issued for European Patent Application No. 20781979.8, Nov. 25, 2022, 9 pages.

* cited by examiner

TRANSFER SHEET AND MANUFACTURING METHOD FOR SAME, METHOD FOR MANUFACTURING MOLDED BODY USING SAID TRANSFER SHEET AND MOLDED BODY, AND FRONT PLATE USING SAID MOLDED BODY AND IMAGE DISPLAY DEVICE

TECHNICAL FIELD

The present invention relates to a transfer sheet and a method for manufacturing the same, a method for manufacturing a molded body using the transfer sheet and a molded body, and a front plate using the molded body and an image display device.

BACKGROUND ART

It may be required to impart predetermined functions such as antireflective properties and antifouling properties to the surface of an arbitrary adherend. In such a case, for example, insert molding is performed.

The insert molding is an approach of arranging a functional film having a functional layer on a support in a mold for injection molding, pouring an injection resin to the support side, and integrating the support side of the functional film with the injection resin which is an adherend to obtain a molded body.

However, in the case of insert molding, there arises a problem of an increased thickness of the whole molded body or impaired texture of an adherend, because a relatively thick support is present between an adherend and a functional layer.

Meanwhile, an approach of imparting a predetermined function to the surface of an adherend by directly applying a functional coating material to the surface of the adherend using a spray or the like is also performed. This approach can solve the aforementioned problem. However, in the case of directly coating the surface of an adherend, there arises a problem of the ununiformity in function ascribable to the ununiformity in coating. Particularly, in the case of having an asperity shape on the surface of an adherend, the problem of the ununiformity in coating tends to be more conspicuous.

As an approach other than insert molding and direct coating, an approach of forming a functional layer on an adherend by transfer using a transfer sheet has been proposed (PTL1 to PTL4).

CITATION LIST

Patent Literature

PTL1: JP 2014-130298 A
PTL2: JP 2009-072954 A
PTL3: JP 2009-056674 A
PTL4: JP 2008-151930 A

SUMMARY OF INVENTION

Technical Problem

However, in the case of transferring a functional layer onto an adherend using a transfer sheet disclosed in any of PTL1 to PTL4, cases in which the transferred functional layer cannot sufficiently exert its function have frequently occurred, as compared with insert molding or direct coating.

An object of the present invention is to provide a method for manufacturing a transfer sheet which can impart a sufficient function to an adherend, and a transfer sheet. Another object of the present invention is to provide a molded body provided with a sufficient function by a transfer layer, a method for manufacturing the molded body, a front plate using the molded body and an image display device.

Solution to Problem

The present invention which attains the aforementioned objects provides the following [1] to [6].
[1] A method for manufacturing a transfer sheet, comprising performing the following steps (1) and (2) in order:
    (1) applying a coating liquid for forming a transfer layer onto a release substrate 1 to form a transfer layer comprising at least one functional layer; and
    (2) laminating a release substrate 2 onto the transfer layer to obtain a transfer sheet A comprising the release substrate 1, the transfer layer and the release substrate 2 in the presented order and having a peel strength 2 between the release substrate 2 and the transfer layer larger than a peel strength 1 between the release substrate 1 and the transfer layer.
[2] The method for manufacturing a transfer sheet according to the above [1], further performing the following step (3):
    (3) peeling the release substrate 1 from the transfer sheet A to obtain a transfer sheet B comprising the transfer layer on the release substrate 2.
[3] A method for manufacturing a molded body, comprising performing the following steps (4) and (5) in order:
    (4) adhering the surface of the transfer sheet B according to the above [2] on the transfer layer side to an adherend to obtain a laminate C; and
    (5) peeling the release substrate 2 from the laminate C to obtain a molded body comprising a transfer layer on the adherend.
[4] A transfer sheet A comprising a release substrate 1, a transfer layer and a release substrate 2 in the presented order and having a peel strength 2 between the release substrate 2 and the transfer layer larger than a peel strength 1 between the release substrate 1 and the transfer layer, the transfer layer comprising at least one functional layer, wherein the function of at least one of the functional layer(s) is unevenly distributed on the release substrate 2 side.
[5] A transfer sheet B comprising a transfer layer on a release substrate 2, the transfer layer comprising at least one functional layer, wherein the function of at least one of the functional layer(s) is unevenly distributed on the release substrate 2 side.
[6] A molded body comprising a transfer layer on an adherend, the transfer layer comprising at least one functional layer, wherein the function of at least one of the functional layer(s) is unevenly distributed on the side opposite to the adherend.

Advantageous Effects of Invention

According to the method for manufacturing a transfer sheet of the present invention, a transfer sheet which can impart a sufficient function to an adherend can be manufactured in a simplified manner. The transfer sheet of the present invention can impart a sufficient function to an adherend.

According to the method for manufacturing a molded body of the present invention, a molded body provided with a sufficient function by a transfer layer can be manufactured in a simplified manner. The molded body of the present invention and a front plate and an image display device using this molded body can have a sufficient function of the molded body, etc. having a transfer layer.

DESCRIPTION OF EMBODIMENTS

[Method for Manufacturing Transfer Sheet]

The method for manufacturing a transfer sheet of the present invention comprises performing the following steps (1) and (2) in order:

(1) applying a coating liquid for forming a transfer layer onto a release substrate 1 to form a transfer layer comprising at least one functional layer; and
(2) laminating a release substrate 2 onto the transfer layer to obtain a transfer sheet A comprising the release substrate 1, the transfer layer and the release substrate 2 in the presented order and having a peel strength 2 between the release substrate 2 and the transfer layer larger than a peel strength 1 between the release substrate 1 and the transfer layer.

Figure 1:
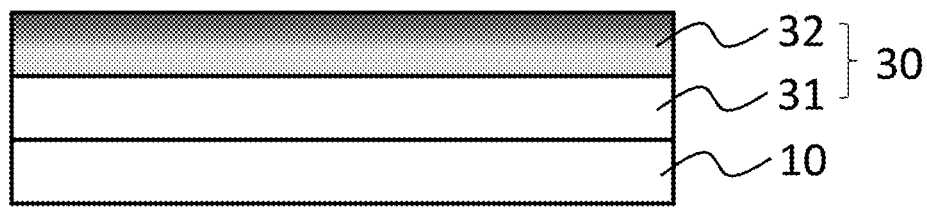
FIG. 1 is a cross-sectional view showing one embodiment of an in-process item of release sheet A of the present invention.

FIG. 1 is a cross-sectional view showing one embodiment of a laminate at the completion of the step (1). The laminate of FIG. 1 has a transfer layer 30 on a release substrate 1 (10).

Figure 2:
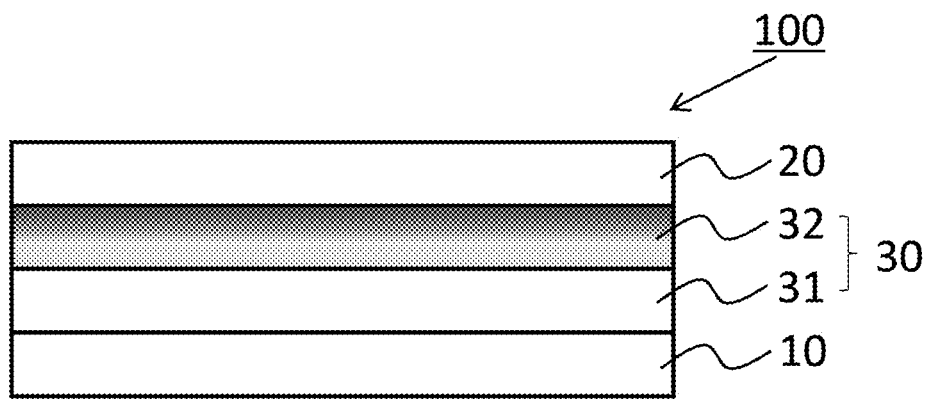
FIG. 2 is a cross-sectional view showing one embodiment of release sheet A of the present invention.

FIG. 2 is a cross-sectional view showing one embodiment of a transfer sheet A (100) obtained through the step (1) and the step (2). The transfer sheet A (100) of FIG. 2 has the transfer layer 30 and a release substrate 2 (20) on the release substrate 1 (10).

In FIG. 1 and FIG. 2, the transfer layer 30 comprises two functional layers (functional layer 1 (31) and functional layer 2 (32)). In FIG. 1 and FIG. 2, the gradation of the functional layer 2 (32) indicates the degree of uneven distribution of a functional component of the functional layer 2 (32) (darker color means a higher density of the functional component).

<Step (1)>

The step (1) is the step of applying a coating liquid for forming a transfer layer onto a release substrate 1 to form a transfer layer comprising at least one functional layer.

Examples of the approach of applying a coating liquid for forming a transfer layer onto a release substrate 1 include ordinary application approaches such as gravure coating, die coating and bar coating. In the case where the transfer layer has two or more functional layers, the functional layers may be sequentially formed or may be simultaneously formed using application equipment capable of simultaneous multilayer application.

After the application of the coating liquid for forming a transfer layer, it is preferred to volatilize a solvent or cure a resin composition, if necessary, by drying and/or ultraviolet irradiation.

<<Release Substrate 1>>

The release substrate 1 can be used without particular limitations as long as it can be peeled from the transfer layer, and a plastic film is preferably used.

Examples of the plastic film for use as the release substrate 1 include plastic films formed from one or two or more of a polyolefin resin such as polyethylene and polypropylene, a vinyl resin such as polyvinyl chloride, polyvinylidene chloride, polyvinyl alcohol, an ethylene-vinyl acetate copolymer, and an ethylene-vinyl alcohol copolymer, a polyester resin such as polyethylene terephthalate, polyethylene naphthalate, and polybutylene terephthalate, an acrylic resin such as polymethyl (meth)acrylate and polyethyl (meth)acrylate, a styrene resin such as polystyrene, a polyamide resin such as nylon 6 and nylon 66, a cellulose resin such as triacetylcellulose, a polycarbonate resin, and a polyimide resin.

For the release substrate 1, it is preferred that its surface should be subjected to release treatment with a release agent such as a fluorine-based release agent and a silicone-based release agent, from the viewpoint of improving peel properties from the transfer layer and from the viewpoint of rendering the peel strength 2 larger than the peel strength 1.

From the aforementioned two viewpoints, it is preferred that the surface profile of the release substrate 1 should be nearly smooth. Specifically, it is preferred that the surface of the release substrate 1 on the side where the transfer layer is formed should have arithmetic average roughness Ra of 0.04 μm or less according to JIS B0601:1994 at a cutoff value of 0.25 mm. Ra of the release substrate 1 can be measured under the following measurement conditions, for example, by preparing a sample for evaluation in which a black acrylic plate (manufactured by Kuraray Co., Ltd., trade name "Comoglas 502K") is adhered via a transparent pressure-sensitive adhesive (manufactured by Hitachi Chemical Co., Ltd., trade name "DA-1000") to the surface of a 100 mm×100 mm cut piece of the release substrate 1 on the side where the transfer layer is not laminated, and placing the sample on a horizontal plane.

<Ra Measurement Conditions>

Reference length (cutoff value λc of a roughness curve): 0.25 mm

Evaluation length (reference length (cutoff value λc)×5): 1.25 mm

Feed rate of stylus: 0.1 mm/s

Longitudinal magnification: 100000-fold

Lateral magnification: 50-fold

Skid: not used (no contact with a measurement surface)

Type of cutoff filter: Gaussian

JIS mode: JIS1994

The release substrate 1 may have an antistatic layer from the viewpoint of suppressing peeling charge.

The thickness of the release substrate 1 is not particularly limited and is preferably 10 to 500 μm, more preferably 20 to 400 μm, further preferably 30 to 300 μm, from the viewpoint of handleability. The upper limit value of the thickness of the release substrate 1 is more preferably 90 μm or less, most preferably 45 μm or less, from the viewpoint of rending the whole transfer sheet A flexible and more improving handleability.

T2/T1 under the assumption that the thickness of the release substrate 1 is defined to be T1 and the thickness of the release substrate 2 is defined to be T2 is preferably more than 1.00, more preferably 1.10 or more, further preferably 1.20 or more, from the viewpoint of handleability after peeling of the release substrate 1. T2/T1 is preferably 2.00 or less, more preferably 1.80 or less, further preferably 1.60 or less, from the viewpoint of suppressing the curling of the transfer sheet.

<<Transfer Layer>>

The transfer layer is a layer to be transferred to an adherend and has a role in imparting a predetermined function to an adherend.

The transfer layer comprises at least one functional layer. The number of functional layers contained in the transfer layer may be only one layer, may be two layers as shown in FIGS. 1 and 2, or may be three or more layers.

Examples of the functional layer include hardcoat layers, low refractive index layers, high refractive index layers, anti-glare layers, antifouling layers, stress relaxation layers, antistatic layers, gas barrier layers, ultraviolet absorption layers, coloring layers, absorption layers for specific wavelengths, antifogging layers and transparent conductive layers.

The functional layer may have a combination of two or more of the aforementioned functions. Specifically, in this description, the representation of each functional layer such as a hardcoat layer, a low refractive index layer, a high refractive index layer, an anti-glare layer, an antifouling layer, a stress relaxation layer, an antistatic layer, a gas barrier layer, an ultraviolet absorption layer, a coloring layer, an absorption layer for a specific wavelength, an antifogging layer and a transparent conductive layer means not only a functional layer having a single function but a functional layer(s) having combined functions. For example, the hardcoat layer includes an antifouling hardcoat layer, an anti-glare hardcoat layer and a high refractive index hardcoat layer, etc. The antifouling layer includes an anti-glare antifouling layer and a low refractive index antifouling layer, etc.

The transfer layer may have other layers, such as an adhesive layer and an anchor layer, which do not impart a special function to an adherend, in addition to the functional layer.

The adhesive layer is arranged between functional layers so as to have a role in enhancing the interlayer adhesiveness between the functional layers, or positioned on the side most distant from the release substrate 2 so as to have a role in enhancing the adhesiveness between the transfer layer and an adherend. The adhesive layer can be formed from a coating liquid for forming an adhesive layer, containing an ordinary resin component that exhibits adhesiveness.

In the case where the functional layer has adhesiveness so that the adherence between the functional layer and an adherend is favorable or in the case of using double-faced adhesive sheet for adhering the transfer layer to an adherend, the adhesive layer may not be disposed on the side most distant from the release substrate 2.

The adhesive layer may be a pressure-sensitive adhesive layer or may be an adhesive layer having heat sealing properties.

In the case of arranging the adhesive layer at a position most distant from the release substrate 2 (a position in contact with the release substrate 1), the adhesive layer is preferably an adhesive layer having heat sealing properties. The adhesive layer having heat sealing properties rarely has tack feel at normal temperature and therefore permits winding in the form of a roll in the state of a transfer sheet B obtained by peeling the release substrate 1 from a transfer sheet A and can improve handleability. Furthermore, the adhesive layer having heat sealing properties can facilitate rendering the peel strength 2 larger than the peel strength 1.

The thickness of the adhesive layer is preferably 0.5 to 50 μm, more preferably 1 to 30 μm, further preferably 2 to 20 μm.

The anchor layer has a role, etc. in protecting the functional layer from the heat of an injection resin in performing in-mold molding mentioned later, for example, by forming the anchor layer on the more release substrate 1 side than the functional layer (the side more distant from the release substrate 2 than the functional layer).

The anchor layer preferably contains a cured product of a curable resin composition.

Examples of the curable resin composition include thermosetting resin compositions and ionizing radiation-curable resin compositions. One type of resin composition may be used, or a plurality of resin compositions may be mixed.

An embodiment of the ionizing radiation-curable resin composition of the anchor layer is the same as an embodiment of the ionizing radiation-curable resin composition of a hardcoat layer mentioned later.

The thermosetting resin composition of the anchor layer is a composition containing at least a thermosetting resin and is a resin composition to be cured by heating. Examples of the thermosetting resin include acrylic resin, urethane resin, phenol resin, urea-melamine resin, epoxy resin, unsaturated polyester resin, and silicone resin. In the thermosetting resin composition, if necessary, a curing agent is added to such a curable resin.

The thickness of the anchor layer is preferably 0.1 to 6 μm, more preferably 0.5 to 5 μm.

Specific examples of the functional layer contained in the transfer layer include (1) to (9) given below. In (1) to (9) given below, "I" represents the interface of each functional layer, and the right side represents the release substrate 2 side. In (1) to (9) given below, each of the antifouling layer, the hardcoat layer, the high refractive index layer, the low refractive index layer and the anti-glare layer may be a combined functional layer having other functions. It is preferred that, for example, the antifouling layer of (1), the anti-glare layer of (5), or the anti-glare layer of (6) should have hardcoat performance.

(1) Antifouling layer
(2) Hardcoat layer/antifouling layer
(3) Hardcoat layer/high refractive index layer/antifouling low refractive index layer
(4) High refractive index hardcoat layer/antifouling low refractive index layer
(5) Anti-glare layer
(6) Anti-glare layer/low refractive index layer
(7) Hardcoat layer/anti-glare layer
(8) Hardcoat layer/anti-glare layer/antifouling low refractive index layer
(9) Anti-glare layer/hardcoat layer/antifouling low refractive index layer Hereinafter, the hardcoat layer, the low refractive index layer, the high refractive index layer, the anti-glare layer and the antifouling layer, which are typical examples of the functional layer, will be specifically described.

—Hardcoat Layer—

The hardcoat layer which is one example of the functional layer preferably contains a cured product of a curable resin composition such as a thermosetting resin composition or an ionizing radiation-curable resin composition and more preferably contains a cured product of an ionizing radiation-curable resin composition, from the viewpoint of scratch resistance. One type of resin composition may be used, or a plurality of resin compositions may be mixed.

The thermosetting resin composition is a composition containing at least a thermosetting resin and is a resin composition to be cured by heating. Examples of the thermosetting resin include acrylic resin, urethane resin, phenol resin, urea-melamine resin, epoxy resin, unsaturated polyester resin, and silicone resin. In the thermosetting resin composition, if necessary, a curing agent is added to such a curable resin.

The ionizing radiation-curable resin composition is a composition containing a compound having an ionizing radiation-curable functional group (hereinafter, also referred to as an "ionizing radiation-curable compound"). Examples of the ionizing radiation-curable functional group includes ethylenic unsaturated bond groups such as a (meth)acryloyl group, a vinyl group and an allyl group, and an epoxy group, and an oxetanyl group. The ionizing radiation-curable compound is preferably a compound having an ethylenic unsaturated bond group, more preferably a compound having two or more ethylenic unsaturated bond groups, further preferably a (meth)acrylate compound having two or more ethylenic unsaturated bond groups. Both a monomer and an oligomer can be used as the (meth)acrylate compound having two or more ethylenic unsaturated bond groups.

The ionizing radiation means one having an energy quantum capable of polymerizing or crosslinking molecules, among electromagnetic waves and charged particle radiations, and, ultraviolet ray (UV) or electron beam (EB) is usually used. In addition, electromagnetic waves such as X ray and γ ray, and charged particle radiations such as a ray and ion beam are also usable.

In this description, (meth)acrylate means acrylate or methacrylate; (meth)acrylic acid means acrylic acid or methacrylic acid; and a (meth)acryloyl group means an acryloyl group or a methacryloyl group.

The thickness of the hardcoat layer is preferably 0.1 μm or more, more preferably 0.5 μm or more, further preferably 1.0 μm or more, still further preferably 2.0 μm or more, from the viewpoint of scratch resistance. The thickness of the hardcoat layer is preferably 100 μm or less, more preferably 50 μm or less, more preferably 30 μm or less, more preferably 20 μm or less, more preferably 15 μm or less, more preferably 10 μm or less, from the viewpoint of facilitating suppressing the occurrence of cracks in the transfer layer at the time of transfer.

—Low Refractive Index Layer—

The low refractive index layer which is one example of the functional layer has a role in enhancing the antireflective properties of an adherend. In the case where the transfer layer has two or more functional layers, it is preferred that the low refractive index layer should be formed on the side most distant from the release substrate 1. The low refractive index layer preferably possesses antifouling properties. Specifically, the low refractive index layer is preferably an antifouling low refractive index layer.

Antireflective properties can be more enhanced by forming a high refractive index layer mentioned later adjacently to the low refractive index layer on the more release substrate 1 side than the low refractive index layer.

The refractive index of the low refractive index layer is preferably 1.10 to 1.48, more preferably 1.20 to 1.45, more preferably 1.26 to 1.40, more preferably 1.28 to 1.38, more preferably 1.30 to 1.32. In this description, the refractive indexes of the low refractive index layer and the high refractive index layer refer to a refractive index at a wavelength of 589.3 nm.

The thickness of the low refractive index layer is preferably 80 to 120 nm, more preferably 85 to 110 nm, more preferably 90 to 105 nm. The thickness of the low refractive index layer is preferably larger than the average particle size of low refractive index particles such as hollow particles.

Approaches of forming the low refractive index layer can be broadly divided into a wet method and a dry method. Examples of the wet method include an approach of formation by a sol-gel method using metal alkoxide, an approach of formation by coating with a low refractive index resin such as fluorine resin, and an approach of formation by coating with a coating liquid for forming a low refractive index layer, containing low refractive index particles in a resin composition. Examples of the dry method include an approach of forming the low refractive index layer by a physical vapor-phase growth method or a chemical vapor-phase growth method. Examples of the material include $SiO_2$, $SiO_x$, (x=1 to 2), and $MgF_2$.

The wet method is superior in production efficiency, suppression of a slanted reflection color phase, and chemical resistance to the dry method. In the present invention, the wet method preferably involves formation using a coating liquid for forming a low refractive index layer, containing low refractive index particles in a binder resin composition, from the viewpoint of adherence, water resistance, scratch resistance and decrease in refractive index. For example, the curable resin composition listed for the hardcoat layer can be used as the binder resin composition, and a curable resin composition mentioned later is preferred.

The low refractive index layer is usually positioned as the outermost surface of a molded body prepared by transferring the transfer layer to an adherend. Hence, the low refractive index layer is required to have favorable scratch resistance. The scratch resistance of the low refractive index layer tends to be more superior as the surface profile is smoother.

In a conventional transfer method, the surface profile of a low refractive index layer is nearly smooth. This is presumably because in the conventional transfer method, a resin coating film containing substantially no low refractive index particles is present in the vicinity of the interface of the low refractive index layer in contact with a release substrate and after transfer, the resin coating film is positioned as the outermost surface of a molded body and the surface of the resin coating film is smooth by reflecting the surface profile of the release substrate.

On the other hand, in the case of using the transfer sheet A of the present invention, the surface of the low refractive index layer as the outermost surface of a molded body is easily generated to micro asperity caused by low refractive index particles. In recent years, hollow particles having a large particle size have been used as low refractive index particles in order to decrease the refractive indexes of low refractive index layers. The present inventors have found as a problem that, even if no scratches are visible even in rubbing of the surface of such a low refractive index layer with an article to which only a fine solid material (for example, sand) is attached or an article to which only an oil content is attached, the surface of the low refractive index layer is scratched by rubbing the layer surface with any article to which both a solid material and an oil content are attached (hereinafter, this problem is also referred to as "oil dust resistance"). The action of rubbing with an article to which a solid material and an oil content are attached corresponds to, for example, the action of an operation of a touch panel type image display device by an operator with a finger onto which any oil content included in cosmetic products, foods, and like and any sand included in the air are attached.

The present inventors have made studies, and as a result, have found that the aforementioned scratches are generated mainly due to chipping-off of a part of the hollow particles included in a low refractive index layer and/or coming off of the hollow particles from a low refractive index layer. The reason for such scratches is considered because of large asperity due to hollow particles formed on a surface of the low refractive index layer. That is, in a case where a low refractive index layer surface is rubbed with a finger onto which a solid material and an oil content are attached, the oil content serves as a binder and the finger is moved on the low refractive index layer surface with a solid material being attached onto the finger. It is here considered that a phenomenon where a portion of the solid material (for example, a protruded part of sand) enters into a concave portion of the low refractive index layer surface and a phenomenon where the solid material entering into the concave portion slips from the concave portion together with the finger, and traverses a convex portion (hollow particles) easily occur, and at that time a large force is applied to the convex portion (hollow particles), thereby the hollow particles are damaged or come off. It is also considered that a resin itself located on the concave portion is also scratched due to friction with the solid material, thereby the hollow particles are more likely to come off due to damage on the resin.

Figure 6:
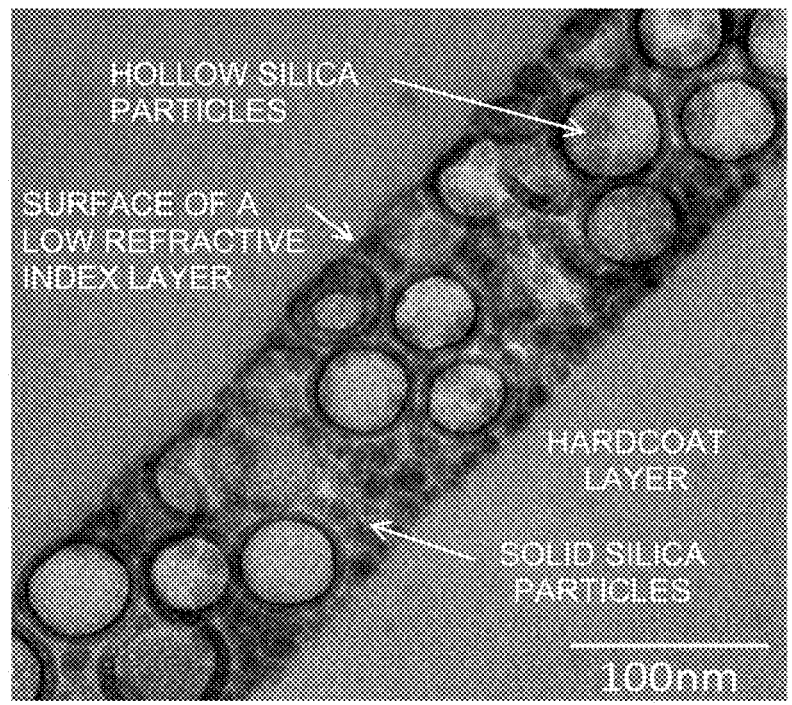
FIG. 6 is a cross-sectional photograph of one example of a low refractive index layer in which hollow particles and non-hollow particles are uniformly dispersed.
Figure 7:
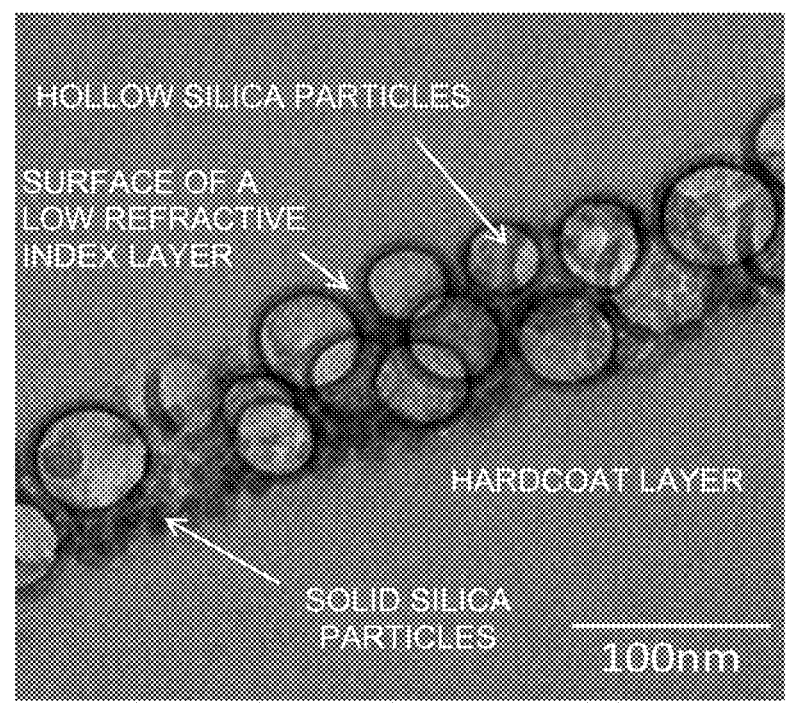
FIG. 7 is a cross-sectional photograph of one example of a low refractive index layer in which hollow particles and non-hollow particles are not uniformly dispersed.

The present inventors have made intensive studies and found that combined use of hollow particles and non-hollow particles as low refractive index particles and uniform dispersion of the hollow particles and the non-hollow particles are effective for conferring oil dust resistance. FIG. 6 shows a cross-sectional photograph of a low refractive index layer in which hollow particles and non-hollow particles are uniformly dispersed. FIG. 7 shows a cross-sectional photograph of a low refractive index layer in which hollow particles and non-hollow particles are not uniformly dispersed. The cross-sectional photographs of FIG. 6 and FIG. 7 were obtained by observation using electron microscope H-7650 manufactured by Hitachi High-Tech Corp. under conditions involving an emission current of 10 μA, an accelerating voltage of 100 keV, and filament voltage of 20 V.

For decreasing the refractive index of the low refractive index layer while improving oil dust resistance, the low refractive index particles preferably comprise hollow particles and non-hollow particles.

The materials of the hollow particles and the non-hollow particles may be any of an inorganic compound such as silica and magnesium fluoride, and an organic compound. Silica is preferred from the viewpoint of decrease in refractive index and strength. Hereinafter, hollow silica particles and non-hollow silica particles will be described as a center.

The hollow silica particles refer to particles which each have an outer shell layer made of silica, have a hollow thereinside, surrounded by the outer shell layer, and include air in the hollow. The hollow silica particles are particles which each include air to thereby have a lowered refractive index proportional to the occupancy of the hollow thereinside, as compared with the refractive index inherent to silica. The non-hollow silica particles are particles each having no hollow thereinside unlike the hollow silica particles. The non-hollow silica particles are, for example, solid silica particles.

Each shape of the hollow silica particles and the non-hollow silica particles is not particularly limited, and may be any of a completely spherical shape, an elliptic rotary body-like shape, and a substantially spherical shape such as a polyhedron shape that can be approximated to a spherical body. In particular, the shape is preferably a completely spherical shape, an elliptic rotary body-like shape or a substantially spherical shape in consideration of scratch resistance.

The hollow silica particles include air thereinside, and thus serve to reduce the refractive index of the entire low refractive index layer. The refractive index of the low refractive index layer can be further reduced by using the hollow silica particles with a large particle size which are increased in rate of air. On the other hand, the hollow silica particles tend to be inferior in mechanical strength. In a case where the hollow silica particles with a large particle size which are increased in rate of air are used, scratch resistance of the low refractive index layer tends to be easily deteriorated.

The non-hollow silica particles serve to enhance scratch resistance of the low refractive index layer when the non-hollow silica particles are dispersed in the binder resin.

In order that the hollow silica particles and the non-hollow silica particles are contained in the binder resin at high concentrations and the particles are uniformly dispersed in the resin in the thickness direction, the average particle size of the hollow silica particles and the average particle size of the non-hollow silica particles are preferably set so that the hollow silica particles are close to each other and furthermore the non-hollow particles can be present between the hollow silica particles. Specifically, the ratio of the average particle size of the non-hollow silica particles to the average particle size of the hollow silica particles (the average particle size of the non-hollow silica particles/the average particle size of the hollow silica particles) is preferably 0.29 or less, more preferably 0.20 or less. The ratio of the average particle size is preferably 0.05 or more. The average particle size of the hollow silica particles is preferably 50 nm or more and 100 nm or less, more preferably 60 nm or more and 80 nm or less in consideration of optical characteristics and mechanical strength. The average particle size of the non-hollow silica particles is preferably 5 nm or more and 20 nm or less, more preferably 10 nm or more and 15 nm or less in consideration of dispersibility with prevention of aggregation of the non-hollow silica particles.

The surfaces of the hollow silica particles and the non-hollow silica particles are preferably coated with a silane coupling agent. The silane coupling agent having a (meth)acryloyl group or an epoxy group are preferably used.

Affinity between the silica particles and the binder resin can be enhanced by subjecting the silica particles to the surface treatment with a silane coupling agent, and thereby aggregation of the silica particles hardly occurs. Thus, the silica particles are easily uniformly dispersed.

Examples of the silane coupling agent include 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, 3-glycidoxypropyltriethoxysilane, N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, tris-(trimethoxysilylpropyl)isocyanurate, 3-mercaptopropylmethyldimethoxysilane, 3-mercaptopropyltrimethoxysilane, 3-isocyanatopropyltriethoxysilane, methyltrimethoxysilane, dimethyldimethoxysilane, phenyltrimethoxysilane, methyltriethoxysilane, dimethyldiethoxysilane, phenyltriethoxysilane, n-propyltrimethoxysilane, n-propyltriethoxysilane, hexyltrimethoxysilane, hexyltriethoxysilane, octyltriethoxysilane, decyltrimethoxysilane, 1,6-bis(trimethoxysilyl)hexane, trifluoropropyltrimethoxysilane, vinyltrimethoxysilane, and vinyltriethoxysilane. In particular, at least one selected from 3-methacryloxypropylmethyldimethoxysilane, 3-methacryloxypropyltrimethoxysilane, 3-methacryloxypropylmethyldiethoxysilane, and 3-methacryloxypropyltriethoxysilane is preferably used.

As the content of the hollow silica particles is increased, the rate of packing of the hollow silica particles relative to the binder resin is increased and the refractive index of the low refractive index layer is reduced. Thus, the content of the hollow silica particles is preferably 100 parts by mass or more, more preferably 150 parts by mass or more based on 100 parts by mass of the binder resin.

On the other hand, in a case where the content of the hollow silica particles relative to the binder resin is too high, not only the hollow silica particles exposed from the binder resin are increased, but also the binder resin for binding between the particles is decreased. Thus, the hollow silica particles tend to be damaged or come off easily, and tend to cause the low refractive index layer to be deteriorated in mechanical strength such as scratch resistance. In a case where the content of the hollow silica particles is too high, transfer aptitude tends to be impaired. Thus, the content of the hollow silica particles is preferably 400 parts by mass or less, more preferably 300 parts by mass or less based on 100 parts by mass of the binder resin.

In a case where the content of the non-hollow silica particles is low, there may be no influence on an increase in hardness even in the presence of the non-hollow silica particles in the surface of the low refractive index layer. In a case where the non-hollow silica particles are contained in a large amount, the influence of the ununiformity in shrinkage due to polymerization of the binder resin can be decreased and the asperity occurring on the low refractive index layer surface after curing of the resin can be decreased. The asperity thus decreased on the low refractive index layer surface is preferred because oil dust resistance and antifouling properties can be improved. Thus, the content of the non-hollow silica particles is preferably 90 parts by mass or more, more preferably 100 parts by mass or more based on 100 parts by mass of the binder resin.

On the other hand, in a case where the content of the non-hollow silica particles is too high, the non-hollow silica is easily aggregated to thereby cause the ununiformity in shrinkage of the binder resin to occur, resulting in an increase in surface asperity. In a case where the content of the non-hollow silica particles is too high, transfer aptitude tends to be impaired. Thus, the content of the non-hollow silica particles is preferably 200 parts by mass or less, more preferably 150 parts by mass or less based on 100 parts by mass of the binder resin.

Barrier properties of the low refractive index layer can be enhanced by containing the hollow silica particles and the non-hollow silica particles at the aforementioned respective proportions in the binder resin. It is presumed that the silica particles are uniformly dispersed at a high rate of packing to thereby allow permeation of gas or the like to be inhibited.

Various cosmetic products such as a sunscreen and a hand cream may contain a low molecular weight polymer low in volatility. The low molecular weight polymer can be inhibited from penetrating into the inside of a coating film of the low refractive index layer by an improvement in barrier properties of the low refractive index layer. Therefore any failure (for example, appearance abnormality) due to the long-term remaining of the low molecular weight polymer in the coating film can be suppressed.

The binder resin of the low refractive index layer preferably contains a cured product of an ionizing radiation-curable resin composition. The ionizing radiation-curable compound contained in the ionizing radiation-curable resin composition is preferably a compound having an ethylenic unsaturated bond group. Among others, a (meth)acrylate compound having a (meth)acryloyl bond is more preferred.

Hereinafter, a (meth)acrylate compound having four or more ethylenic unsaturated bond groups is referred to as "multifunctional (meth)acrylate compound". A (meth)acrylate compound having 2 to 3 ethylenic unsaturated bond groups is referred to as "low functional (meth)acrylate compound".

Both a monomer and an oligomer can be used as the (meth)acrylate compound. The ionizing radiation-curable compound further preferably includes a low functional (meth)acrylate compound, in particular, from the viewpoint that the ununiformity in shrinkage on curing is suppressed and the asperity shape of the low refractive index layer surface is easily smoothed. The asperity shape thus smoothed of the low refractive index layer surface is preferred because oil dust resistance and antifouling properties can be improved. Use of the low functional (meth)acrylate compound is also preferred because the transfer aptitude of the transfer layer is improved.

The proportion of the low functional (meth)acrylate compound in the ionizing radiation-curable compound is preferably 60% by mass or more, more preferably 80% by mass or more, further preferably 90% by mass or more, still further preferably 95% by mass or more, most preferably 100% by mass.

The low functional (meth)acrylate compound is preferably a bifunctional (meth)acrylate compound having two ethylenic unsaturated bond groups, from the viewpoint that the ununiformity in shrinkage on curing is suppressed and the asperity shape of the low refractive index layer surface is easily smoothed.

Examples of the bifunctional (meth)acrylate compound as the (meth)acrylate compound include di(meth)acrylate isocyanurate, polyalkylene glycol di(meth)acrylate such as ethylene glycol di(meth)acrylate, polyethylene glycol diacrylate, and polybutylene glycol di(meth)acrylate, bisphenol A tetraethoxy diacrylate, bisphenol A tetrapropoxy diacrylate, and 1,6-hexanediol diacrylate.

Examples of the trifunctional (meth)acrylate compound include trimethylolpropane tri(meth)acrylate, pentaerythritol tri(meth)acrylate, and isocyanuric acid-modified tri(meth)acrylate.

Examples of the tetrafunctional or higher functional multifunctional (meth)acrylate compound include pentaerythritol tetra(meth)acrylate, dipentaerythritol hexa(meth)acrylate, and dipentaerythritol tetra(meth)acrylate.

Such (meth)acrylate compounds may be each modified as described below.

Examples of the (meth)acrylate oligomer include an acrylate polymer such as urethane (meth)acrylate, epoxy (meth) acrylate, polyester (meth)acrylate, and polyether (meth) acrylate.

The urethane (meth)acrylate is obtained, for example, by reacting a polyhydric alcohol and an organic diisocyanate with hydroxy (meth)acrylate.

Preferred examples of the epoxy (meth)acrylate include a (meth)acrylate obtained by reacting a trifunctional or higher functional aromatic epoxy resin, alicyclic epoxy resin, aliphatic epoxy resin or the like with a (meth)acrylic acid, a (meth)acrylate obtained by reacting a bifunctional or higher functional aromatic epoxy resin, alicyclic epoxy resin, aliphatic epoxy resin or the like with a polybasic acid and a (meth)acrylic acid, and a (meth)acrylate obtained by reacting a bifunctional or higher functional aromatic epoxy resin, alicyclic epoxy resin, aliphatic epoxy resin or the like with a phenol compound and a (meth)acrylic acid.

The (meth)acrylate compound may have a modified partial molecular structure to enhance the smoothness of the surface by suppressing shrinkage ununiformity in crosslinking. The asperity shape thus smoothed of the low refractive index layer surface is preferred because oil dust resistance and antifouling properties can be improved. For example, a (meth)acrylate compound modified with ethylene oxide, propylene oxide, caprolactone, isocyanuric acid, alkyl, cyclic alkyl, aromatic, bisphenol, or the like can also be used. In particular, the (meth)acrylate compound is preferably modified with an alkylene oxide such as ethylene oxide or propylene oxide from the viewpoint that the affinity with the low refractive index particles (in particular silica particles) is enhanced and aggregation of the low refractive index particles is suppressed. The proportion of the alkylene oxide-modified (meth)acrylate compound in the ionizing radiation-curable compound is preferably 60% by mass or more, more preferably 80% by mass or more, further preferably 90% by mass or more, still further preferably 95% by mass or more, most preferably 100% by mass. The alkylene oxide-modified (meth)acrylate compound is preferably a low functional (meth)acrylate compound, more preferably a (meth)acrylate compound having two ethylenic unsaturated bond groups.

Examples of the alkylene oxide-modified (meth)acrylate compound having two ethylenic unsaturated bond groups include bisphenol F alkylene oxide-modified di(meth)acrylate, bisphenol A alkylene oxide-modified di(meth)acrylate, isocyanuric acid alkylene oxide-modified di(meth)acrylate, and polyalkylene glycol di(meth)acrylate, and in particular polyalkylene glycol di(meth)acrylate is preferable. The polyalkylene glycol di(meth)acrylate preferably includes 3 to 5 alkylene glycol repeating units on average. The alkylene glycol included in the polyalkylene glycol di(meth)acrylate is preferably ethylene glycol and/or polyethylene glycol.

Examples of the alkylene oxide-modified (meth)acrylate compound having three ethylenic unsaturated bond groups include trimethylolpropane alkylene oxide-modified tri (meth)acrylate and isocyanuric acid alkylene oxide-modified tri(meth)acrylate.

The ionizing radiation-curable resin can be used singly or in combinations of two or more kinds thereof.

(Element Analysis of Surface Region of Low Refractive Index Layer)

Preferably, the low refractive index layer comprises a binder resin and silica particles, and a ratio of Si element attributed to the silica particles is 10.0 atomic percent or more and 18.0 atomic percent or less and a ratio of C element under the assumption that the ratio of Si element is defined to be 100 atomic percent is 180 atomic percent or more and 500 atomic percent or less, obtained by analysis of a surface region of the low refractive index layer by X-ray photoelectron spectroscopy.

The low refractive index layer thus configured is more preferably an antifouling low refractive index layer. In this configuration the silica particles preferably comprise hollow silica particles and non-hollow silica particles.

In a case where the surface of the low refractive index layer is analyzed by X-ray photoelectron spectroscopy (hereinafter, simply referred to as "XPS"), at least a C element, an O element, and a Si element are detected. The Si element is derived from the silica particles (inorganic component) and an organic component such as a silane coupling agent and/or a leveling agent. The C element is derived from a binder resin, a surface treatment agent (silane coupling agent) of the silica particles, and an additive. Herein, the C element can be considered to be substantially derived from a binder resin, in consideration of the content in the low refractive index layer.

The surface region of the low refractive index layer, analyzed by XPS, exhibits a ratio of Si element attributed to the silica particles, of 10.0 atomic percent or more and 18.0 atomic percent or less, and a ratio of C element under the assumption that the ratio of Si element is defined to be 100 atomic percent, of 180 atomic percent or more and 500 atomic percent or less. In this description, the "surface region" means a region which is in a region detected by X-ray photoelectron spectroscopy and which is a region up to a depth of 10 nm from the surface of the low refractive index layer on the release substrate 2 side (a region up to a depth of 10 nm from the surface of the low refractive index layer on the side opposite to an adherend).

The "ratio of C element under the assumption that the ratio of Si element is defined to be 100 atomic percent" can be calculated according to "C/Si×100(%)". Hereinafter, the "ratio of C element under the assumption that the ratio of Si element is defined to be 100 atomic percent" is sometimes abbreviated as "C/Si". Si studied in this description corresponds to an inorganic Si element attributed to the silica particles, and thus Si means an inorganic Si element also if there is no description.

The C/Si in the surface region of the low refractive index layer reflects a distribution state of non-hollow silica particles and hollow silica particles in the thickness direction of the low refractive index layer.

In a case where the silica particles are unevenly distributed close to a surface located opposite to the low refractive index layer, the ratio of Si element attributed to the silica particles in the surface region is low and the ratio of C element is relatively high. A case where the silica particles are buried in the binder resin and are almost not present in the low refractive index layer surface also shows the same tendency. On the other hand, in a case where the silica particles (in particular, hollow silica particles) are not covered with the binder resin but exposed on the low refractive index layer surface, or in a case where covering with the binder resin is very thin, falling in a nearly exposed state, the ratio of Si element attributed to the silica particles is high and the ratio of C element is relatively low.

The ratio of Si element attributed to the silica particles in the surface region of the low refractive index layer reflects a presence state of non-hollow silica particles and hollow silica particles in the surface region.

Even when hollow silica is largely present in the surface region of the low refractive index layer, the hollow silica particles does not highly contribute to an increase in ratio of Si element attributed to the silica particles since they are hollow, while when non-hollow silica particles are largely present in the surface region, a ratio of Si element attributed to the silica particles increases. The ratio of Si element attributed to the silica particles in the surface region of the low refractive index layer satisfy 10.0 atomic percent or more by the silica particles are present in the surface region of the low refractive index layer in a sufficient amount. In particular, the ratio of Si element attributed to the silica particles is preferably 13.0 atomic percent or more because the non-hollow silica particles are present on the surface at a high concentration and scratch resistance is thus enhanced. In a case where the ratio of Si element attributed to the silica particles is more than 18.0 atomic percent, not only non-hollow silica but also the hollow silica particles are largely present in the surface region and fall in the state in which the silica particles are exposed or nearly exposed on the surface. This tends to cause deterioration in scratch resistance as described below.

The C/Si to satisfy 500 atomic percent or less by the silica particles are present in the surface region of the low refractive index layer in a sufficient amount. In a case where the C/Si is more than 500 atomic percent, the silica particles are buried in the binder resin and the binder resin is excessive in the surface region. This tends to cause deterioration in scratch resistance. In a case where the C/Si is less than 180 atomic percent, the amount of the silica particles present in the surface is increased and in particular falls in the state in which hollow silica particles not covered with the binder resin or hollow silica particles very thinly covered with the binder resin are exposed on the surface. This tends to cause deterioration in scratch resistance. The C/Si is preferably 200 atomic percent or more, more preferably 250 atomic percent or more in consideration of scratch resistance and sufficient covering properties. The C/Si is preferably 400 atomic percent or less, more preferably 350 atomic percent or less.

When the ratio of C element and the ratio of Si element in the surface region of the low refractive index layer within the aforementioned respective ranges, it can be making state the hollow silica particles are covered with an appropriate amount of the binder resin, and a sufficient amount of the non-hollow silica particles are present in spaces between the hollow silica particles. Therefore, it is possible to easily attain a low reflectance and favorable surface resistance, such as high scratch resistance, in which the surface of the low refractive index layer surface is smooth.

Even in a case where a coating liquid for forming a low refractive index layer does not contain a fluorine-containing compound such as a fluorine-based leveling agent, fluorine may be detected on a surface of a low refractive index layer formed. For example, this may be the case where another functional layer adjacent to the low refractive index layer contains a fluorine-based leveling agent so that the leveling agent of this functional layer is diffused to the surface of the low refractive index layer.

In the present embodiment, no F element is preferably detected by XPS, though F element may be detected by XPS without inhibiting the advantageous effects of the present invention. In other words, the surface region of the low refractive index layer preferably contains substantially no fluorine atom. Since the fluorine-containing compound itself tends to be relatively soft, it is possible to facilitate improving scratch resistance by the surface region of the low refractive index layer contains substantially no fluorine atom.

Even in a case where another functional layer adjacent to the low refractive index layer contains a fluorine-based leveling agent, the low refractive index layer exhibits the aforementioned element ratio and contains the silica particles at a high concentration relative to the binder resin, to thereby enable diffusion of the fluorine-containing compound of this functional layer to be suppressed, easily resulting in a state where substantially no F atom is contained in the surface region of the low refractive index layer.

In this description, the phrase "substantially containing no fluorine atom" means that the ratio of F element in the surface region is 0.5 atomic percent or less, more preferably 0.1 atomic percent or less.

The surface region of the low refractive index layer having the aforementioned element ratio is also preferred because high gas barrier properties (water-vapor transmission rate and oxygen gas transmission rate) can be conferred.

The hollow silica particles and the non-hollow silica particles are preferably uniformly dispersed in the low refractive index layer in order that the aforementioned element ratio is realized. In this description, the phrase "uniformly dispersed" means that the hollow silica particles and the non-hollow silica particles are not only uniformly dispersed in the surface region of the low refractive index layer, but also uniformly dispersed in the thickness direction of the low refractive index layer in a cross-sectional view. That is, in a case where XPS analysis is performed in the thickness direction of the low refractive index layer, the ratio of Si element attributed to the silica particles and the C/Si preferably satisfy the aforementioned respective ranges at different points in the thickness direction. For example, in a case where the thickness of the low refractive index layer is trisected and regions obtained are defined as a first region, a second region and a third region sequentially closer to the transparent substrate, arbitrary point in the first region and arbitrary point in the second region also preferably satisfy the aforementioned respective ranges with respect to the ratio of Si element attributed to the silica particles and the C/Si.

FIG. 6 shows a cross-sectional photograph of a low refractive index layer in which hollow particles and non-hollow particles are uniformly dispersed. FIG. 7 shows a cross-sectional photograph of a low refractive index layer in which hollow particles and non-hollow particles are not uniformly dispersed.

The surface of the low refractive index layer in which hollow silica particles and non-hollow silica particles are uniformly dispersed is also preferred because antifouling properties are easily improved.

(Leveling Agent)

The low refractive index layer preferably contains a leveling agent from the viewpoint of antifouling properties and surface smoothness. It is preferred that such leveling agent should have a reactive group such as a (meth)acryloyl group and be reactable with a binder resin.

Examples of the leveling agent include fluorine-based and silicone-based leveling agents. A silicone-based leveling agent is preferred. The silicone-based leveling agent is contained to thereby enable the low refractive index layer surface to be more smoothed. Furthermore, the silicone-based leveling agent compared with the fluorine-based one can facilitate improving the slipping properties and antifouling properties (fingerprint wiping-off properties, and large contact angles with pure water and hexadecane) of the low refractive index layer surface. Also, the silicone-based leveling agent compared with the fluorine-based one is preferred because the hardness of the low refractive index layer is not easily impaired.

The content of the leveling agent is preferably 1 to 25 parts by mass, more preferably 2 to 20 parts by mass, further preferably 5 to 18 parts by mass based on 100 parts by mass of the binder resin.

When the content of the leveling agent is 1 part by mass or more, performance such as antifouling properties can be easily conferred. When the content of the leveling agent is 25 parts by mass or less, deterioration in scratch resistance can be suppressed.

The low refractive index layer has preferably a smooth surface in order that excellent surface resistance is obtained. The maximum height roughness Rz may be 110 nm or less and is preferably 100 nm or less, further preferably 90 nm or less. Rz is preferably 70 nm or less, more preferably 60 nm or less, more preferably 55 nm or less, because further excellent surface resistance is obtained when the surface is smooth.

The Rz/Ra (Ra is arithmetic average roughness) is preferably 22.0 or less, more preferably 18.0 or less, more preferably 16.0 or less, more preferably 12.0 or less, more preferably 10.0 or less, more preferably 9.0 or less.

In this description, Ra and Rz are each obtained by extending the roughness of a two dimensional roughness parameter to three dimensional one as described in scanning probe microscope SPM-9600 upgrade kit instruction manual (SPM-960 February 2016, pp 194-195). Ra and Rz are defined as follows.

(Arithmetic Average Roughness Ra)

Ra is determined by the following expression where only a reference length (L) is extracted from a roughness curve in the direction of an average line, an X-axis is taken in the direction of the average line of the extracted portion and a Y-axis is taken in the longitudinal magnification direction, and the roughness curve is represented by y=f(x).

$$Ra = \frac{1}{L}\int_0^L |f(x)|dx \qquad \text{[Expression 1]}$$

(Maximum Height Roughness Rz)

Rz corresponds to a value obtained by extracting only the reference length from the roughness curve in the direction of the average line, and measuring the interval between the peak line and the valley line of the extracted portion in the longitudinal magnification direction of the roughness curve.

A low Rz means a small convex portion due to hollow silica particles in a micro region. A low Rz/Ra means a uniform asperity due to silica particles in a micro region and means no asperity protruded relative to the average difference of elevation of asperity. The numerical value of Ra is not particularly limited and is preferably 15 nm or less, more preferably 12 nm or less, further preferably 10 nm or less, still further preferably 6.5 nm or less.

The aforementioned ranges of Rz and Rz/Ra are easily satisfied by uniformly dispersing low refractive index particles in the low refractive index layer or suppressing the ununiformity in shrinkage of the low refractive index layer. Also, the aforementioned ranges of Rz and Rz/Ra are easily satisfied when the low refractive index layer exhibits the aforementioned element ratio.

Rz of the surface of the low refractive index layer may be increased to about 90 to 110 nm depending on processing conditions of the low refractive index layer. In a case where Rz/Ra is in the aforementioned range, preferable surface resistance is easily obtained.

When Rz and Rz/Ra of the low refractive index layer surface are in the aforementioned respective ranges, the resistance in traversing of the convex portion (due to any hollow silica particles present in the vicinity of the surface) of the low refractive index layer surface by a solid material can be reduced. It is thus considered that a solid material is smoothly moved on the low refractive index layer surface even in rubbing under loading with sand including an oil content. It is also considered that the hardness itself of the concave portion is increased. It can be presumed that the hollow silica particles are consequently prevented from being broken and/or coming off and the binder resin itself is also prevented from being damaged.

When Rz and Rz/Ra fall within the aforementioned ranges, antifouling properties can also be easily improved.

On the other hand, in a case where Rz and Rz/Ra of the low refractive index layer surface are too low, blocking may occur in the course of production. Thus, Rz is preferably 30 nm or more, more preferably 70 nm or more. Rz/Ra is preferably 3.0 or more, more preferably 5.0 or more.

In this description, various parameters including surface roughness such as Rz and Ra, optical properties such as reflectance Y values, and element ratio each mean an average value of measurement values at 14 points determined by excluding the minimum value and the maximum value from measurement values at 16 points, unless particularly noted.

In this description, in a measurement sample, a region of 0.5 cm in width from the outer periphery is excluded as a margin, lines that evenly divide the remaining region into five portions are drawn in the vertical direction and then in the horizontal direction, and the resulting intersects are preferably used as the centers of measurement, that is, as the 16 measurement positions. For example, in the case that the shape of a measurement sample is a rectangle, a region of 0.5 cm in width from the outer periphery of the rectangle is excluded as a margin, measurement is performed at 16 intersects, as the centers of measurement, formed by drawing lines that evenly divide the remaining region into five portions in the vertical direction and then in the horizontal direction, and the mean value is preferably calculated. In the case that the shape of a measurement sample is a non-rectangular shape such as a circle, an ellipse, a triangle, and a pentagon, a rectangle that is inscribed in the shape is drawn, and measurement is preferably performed at 16 positions in the rectangle according to the mentioned method.

Various parameters such as surface roughness are each a value obtained by measurement at a temperature of 23° C.±5° C. and a relative humidity of 40 to 65%, unless particularly noted. It is noted that an objective sample is exposed to the atmosphere for 30 minutes or more before the start of each measurement and each measurement and each evaluation are performed, unless particularly noted.

The low refractive index layer can be formed by applying and drying a coating liquid for forming a low refractive index layer, prepared by dissolving or dispersing each component constituting the low refractive index layer. Usually, a solvent for adjusting viscosity or enabling each component to be dissolved or dispersed is used in the coating liquid.

Examples of the solvent include a ketone compound (acetone, methyl ethyl ketone, methyl isobutyl ketone, cyclohexanone, and the like), an ether compound (dioxane, tetrahydrofuran, and the like), an aliphatic hydrocarbon compound (hexane and the like), an alicyclic hydrocarbon compound (cyclohexane and the like), an aromatic hydrocarbon compound (toluene, xylene, and the like), a carbon halide compound (dichloromethane, dichloroethane, and the like), an ester compound (methyl acetate, ethyl acetate, butyl acetate, and the like), an alcohol compound (butanol, cyclohexanol, and the like), a cellosolve compound (methyl cellosolve, ethyl cellosolve, and the like), a cellosolve acetate compound, a sulfoxide compound (dimethylsulfoxide and the like), a glycol ether compound (1-methoxy-2-propyl acetate and the like), and an amide compound (dimethylformamide, dimethylacetamide, and the like), and the solvent may be any mixture thereof.

In a case where the solvent is too rapidly volatilized, the solvent is violently convected in drying of the coating liquid for forming a low refractive index layer. Thus, even in a case where the silica particles in the coating liquid are uniformly dispersed, the violent convection of the solvent during drying can easily destroy the uniform dispersion. Therefore, a solvent low in evaporation rate is preferably contained. Specifically, a solvent having a relative evaporation rate (relative evaporation rate under the assumption that the evaporation rate of n-butyl acetate is defined to be 100) of 70 or less is preferably contained, and a solvent having a relative evaporation rate of 30 to 60 is more preferably contained. Such a solvent having a relative evaporation rate of 70 or less is preferably contained at 10 to 50% by mass, preferably 20 to 40% by mass relative to the entire solvent.

The relative evaporation rate of the solvent low in evaporation rate is, for example, 64 with respect to isobutyl alcohol, 47 with respect to 1-butanol, 44 with respect to 1-methoxy-2-propyl acetate, 38 with respect to ethyl cellosolve, and 32 with respect to cyclohexanone.

A remaining solvent (solvent other than the solvent low in evaporation rate) is preferably one excellent in resin solubility. The remaining solvent is preferably one having a relative evaporation rate of 100 or more.

The drying temperature in formation of the low refractive index layer is preferably low as much as possible in order to inhibit convection of solvent during drying and to improve dispersibility of the silica particles. The drying temperature can be appropriately set in consideration of the type of the solvent, dispersibility of the silica particles, the production rate, and the like.

The relative evaporation rate and drying temperature thus controlled for the solvent is also preferred, leading to the smoothness of the surface of the low refractive index layer.

—High Refractive Index Layer—

The refractive index of the high refractive index layer which is one example of the functional layer is preferably 1.53 to 1.85, more preferably 1.54 to 1.80, more preferably 1.55 to 1.75, more preferably 1.56 to 1.70.

The thickness of the high refractive index layer is preferably 200 nm or less, more preferably 50 to 180 nm, further preferably 70 to 150 nm. In the case of a high refractive index hardcoat layer, it is preferred that its thickness should abide by the thickness of the hardcoat layer.

The high refractive index layer can be formed from a coating liquid for forming a high refractive index layer, containing, for example, a binder resin composition and high refractive index particles. For example, the curable resin composition listed for the hardcoat layer can be used as the binder resin composition.

Examples of the high refractive index particles include antimony pentoxide (1.79), zinc oxide (1.90), titanium oxide (2.3 to 2.7), cerium oxide (1.95), tin-doped indium oxide (1.95 to 2.00), antimony-doped tin oxide (1.75 to 1.85), yttrium oxide (1.87), and zirconium oxide (2.10).

The average particle size of the high refractive index particles is preferably 2 nm or more, more preferably 5 nm or more, further preferably 10 nm or more. The average particle size of the high refractive index particles is preferably 200 nm or less, more preferably 100 nm or less, more preferably 80 nm or less, more preferably 60 nm or less, more preferably 30 nm or less, from the viewpoint of suppression of whitening and transparency. A smaller average particle size of the high refractive index particles offers more favorable transparency, and in particular, 60 nm or less can render transparency very favorable.

The average particle size of the high refractive index particles or the low refractive index particles can be calculated through the following operations (y1) to (y3).

(y1) A cross section of the high refractive index layer or the low refractive index layer is pictured with TEM or STEM. In TEM or STEM, preferably, the acceleration voltage is 10 kV to 30 kV and the magnification is 50000 to 300000.

(y2) Arbitrary 10 particles are extracted from the observation image, and the respective particles are measured for the particle size. The particle size is determined by sandwiching the cross section of each of the particles between arbitrary two parallel straight lines, adopting a combination of two straight lines where the maximum distance between straight lines is obtained, and measuring the distance between straight lines in the combination. In a case where the particles are aggregated, the aggregated particles are regarded as one particle for measurement.

(y3) The same operations as above are performed five times on observation images of other screens of the same sample, and the value obtained from the number average of the particle sizes of 50 particles in total is defined as the average particle size of the high refractive index particles or the low refractive index particles.

—Anti-Glare Layer—

The anti-glare layer which is one example of the functional layer has a role in enhancing the anti-glare performance of an adherend.

The anti-glare layer can be formed from a coating liquid for forming an anti-glare layer, containing, for example, a binder resin composition and particles. In addition, it can also be formed through the use of phase separation of a resin composition or formed by allowing such a resin composition exploiting phase separation to contain particles. For example, the curable resin composition listed for the hardcoat layer can be used as the binder resin composition.

As the particles, any of organic particles and inorganic particles can be used. Examples of the organic particles include particles made of polymethyl methacrylate, polyacrylic-styrene copolymers, melamine resin, polycarbonate, polystyrene, polyvinyl chloride, benzoguanamine-melamine-formaldehyde condensates, silicone, fluorine resin and polyester resin. Examples of the inorganic particles include particles made of silica, alumina, antimony, zirconia and titania.

The average particle size of the particles in the anti-glare layer differs depending on the thickness of the anti-glare layer and therefore cannot be generalized. It is preferably 1.0 to 10.0 µm, more preferably 2.0 to 8.0 µm, further preferably 3.0 to 6.0 µm.

The average particle size of the particles of the anti-glare layer can be calculated by the following operations (z1) to (z3).

(z1) A transmission observation image of a cross section of the anti-glare layer is taken under an optical microscope. The magnification is preferably 500 to 2000.

(z2) Arbitrary 10 particles are extracted from the observation image, and the respective particles are measured for the particle size. The particle size is determined by sandwiching the cross section of each of the particles between arbitrary two parallel straight lines, adopting a combination of two straight lines where the maximum distance between straight lines is obtained, and measuring the distance between straight lines in the combination.

(z3) The same operations as above are performed five times on observation images of other screens of the same sample, and the value obtained from the number average of the particle sizes of 50 particles in total is defined as the average particle size of the particles in the anti-glare layer.

The content of the particles in the anti-glare layer differs depending on the degree of the intended anti-glare performance and therefore cannot be generalized. It is preferably 1 to 100 parts by mass, more preferably 5 to 50 parts by mass, further preferably 10 to 30 parts by mass based on 100 parts by mass of the resin component.

The anti-glare layer may contain fine particles having an average particle size of less than 500 nm in order to confer antistatic properties, to control a refractive index, or to adjust the shrinkage of the anti-glare layer ascribable to the curing of the curable resin composition.

The thickness of the anti-glare layer is preferably 0.5 μm or more, more preferably 1.0 μm or more, further preferably 2.0 μm or more. The thickness of the anti-glare layer is preferably 50 μm or less, more preferably 30 μm or less, more preferably 20 μm or less, more preferably 15 μm or less, more preferably 10 μm or less.

—Antifouling Layer—

The antifouling layer which is one example of the functional layer has a role in enhancing the antifouling properties of an adherend. In the case where the transfer layer has two or more functional layers, it is preferred that the antifouling layer should be formed on the side most distant from the release substrate 1.

The antifouling layer can be formed from a coating liquid for forming an antifouling layer, containing, for example, a binder resin composition and an antifouling agent. For example, the curable resin composition listed for the hardcoat layer can be used as the binder resin composition.

Examples of the antifouling agent include fluorine resin, silicone resin and fluorine-silicone copolymer resins.

The antifouling agent preferably has a reactive group that is reactable with the binder resin composition in order to suppress bleed-out from the antifouling layer. In other words, it is preferred that in the antifouling layer, the antifouling agent should be fixed in the binder resin composition.

A self-crosslinkable antifouling agent is also preferred from the viewpoint of suppressing bleed-out from the antifouling layer. In other words, it is preferred that in the antifouling layer, the antifouling agent should be self-crosslinked.

The content of the antifouling agent in the antifouling layer is preferably 5 to 30% by mass, more preferably 7 to 20% by mass of the total solid content of the antifouling layer.

The thickness of the antifouling layer is not particularly limited. For example, in the case of an antifouling hardcoat layer, it is preferred that its thickness should abide by the thickness of the hardcoat layer. In the case of an antifouling low refractive index layer, it is preferred that its thickness should abide by the thickness of the low refractive index layer.

The degree of the antifouling properties of the antifouling layer differs depending on the required antifouling properties and therefore cannot be generally defined. The contact angle with pure water is preferably 80 degrees or more, more preferably 85 degrees or more, further preferably 90 degrees or more.

Too large a contact angle of the antifouling layer with pure water relatively increases the content of the antifouling agent in the antifouling layer and may deteriorate the physical properties (scratch resistance, etc.) of the antifouling layer. Thus, the contact angle of the antifouling layer with pure water is preferably 120 degrees or less, more preferably 110 degrees or less, further preferably 100 degrees or less, still further preferably 95 degrees or less.

In the case where other functional layers such as the low refractive index layer have antifouling properties, it is also preferred that their contact angles with pure water should fall within the aforementioned range.

In this description, the contact angle is measured by the θ/2 method.

—Layer Positioned on Side Most Distant from Release Substrate 2—

In the case where the adherend is glass, the layer positioned on the side most distant from the release substrate 2 among layers constituting the transfer layer preferably comprises a resin having one or more functional groups selected from the group consisting of a carboxyl group and a methoxy group. The layer that comprises a resin having one or more functional groups selected from the group consisting of a carboxyl group and a methoxy group can facilitate improving adherence with glass.

The ratio of the resin having one or more functional groups selected from the group consisting of a carboxyl group and a methoxy group to all resin components of the layer is preferably 50% by mass or more, more preferably 70% by mass or more, further preferably 90% by mass or more, still further preferably 95% by mass or more, most preferably 100% by mass.

<Step (2)>

The step (2) is the step of laminating a release substrate 2 onto the transfer layer formed in the step (1) to obtain a transfer sheet A comprising the release substrate 1, the transfer layer and the release substrate 2 in the presented order and having a peel strength 2 between the release substrate 2 and the transfer layer larger than a peel strength 1 between the release substrate 1 and the transfer layer.

In the step (2), an approach of laminating release substrate 2 onto the transfer layer is not particularly limited. The release substrate 2 can be laminated onto the transfer layer, for example, by dry lamination.

In the case where the release substrate 2 has an adhesive layer, the release substrate 2 can be dry-laminated onto the transfer layer through the use of the adhesion power of the adhesive layer. In the case where the functional layer positioned most distant from the release substrate 1 among functional layers constituting the transfer layer has a tack at the time of the step (2), the release substrate 2 can be dry-laminated onto the transfer layer through the use of the tack of the functional layer.

Among the two release substrates contained in the transfer sheet A, the release substrate 1 is peeled before transfer and does not remain at the time of transfer, whereas the release substrate 2 remains at the time of transfer. For rendering only the release substrate 1 peelable before transfer, it is required in the step (2) that a peel strength 2 between the release substrate 2 and the transfer layer should be larger than a peel strength 1 between the release substrate 1 and the transfer layer.

As shown in Comparative Example 4-1, in a case where peeling is triggered by slitting or the like while a transfer sheet is pressed from both sides, the release substrate 1 can be peeled first even in the relationship of "peel strength 2 <peel strength 1". However, the relationship of "peel strength 2<peel strength 1" is not preferred because it markedly complicates a transfer step and impairs the function of the transfer layer by placing burden on the transfer layer at the time of transfer.

The difference between the peel strength 2 and the peel strength 1 (peel strength 2–peel strength 1) is preferably 15 mN/25 mm or more, more preferably 40 mN/25 mm or more, further preferably 100 mN/25 mm or more, from the viewpoint of facilitating peeling only the release substrate 1 before transfer. If the difference is too large, the release substrate 2 may be difficult to peel after transfer. Thus, the difference between is preferably 450 mN/25 mm or less, more preferably 350 mN/25 mm or less, further preferably 300 mN/25 mm or less, still further preferably 200 mN/25 mm or less.

The peel strength 1 is preferably 10 mN/25 mm or more, more preferably 20 mN/25 mm or more, further preferably 40 mN/25 mm or more, still further preferably 50 mN/25 mm or more, from the viewpoint of suppressing the dropping of the release substrate 1. The peel strength 1 is preferably 90 mN/25 mm or less, more preferably 70 mN/25 mm or less, from the viewpoint of accentuating the difference from the peel strength 2.

The peel strength 2 is preferably 100 mN/25 mm or more, more preferably 120 mN/25 mm or more, further preferably 140 mN/25 mm or more, from the viewpoint of accentuating the difference from the peel strength 1. The peel strength 2 is preferably 600 mN/25 mm or less, more preferably 500 mN/25 mm or less, further preferably 400 mN/25 mm or less, still further preferably 300 mN/25 mm or less, from the viewpoint of preventing being cohesive failure the adhesive layer on the release substrate 2 side and the transfer layer at peeling the release substrate 2.

In this description, the peel strength can be measured in accordance with the 180-degree peel test of JIS Z0237:2009. The atmosphere in which the peel strength is measured is preferably 23° C. and 40 to 65% humidity. It is preferred to acclimate a sample to the atmosphere for 30 minutes before measurement of the peel strength. The measurement is carried out three times per sample, and an average value therefrom is regarded as peel strength.

<<Release Substrate 2>>

The release substrate 2 can be used without particular limitations as long as it can be peeled from the transfer layer, and a plastic film is preferably used.

The same as those listed as the plastic film of the release substrate 1 can be used as the plastic film for use in the release substrate 2.

It is preferred that the surface of the release substrate 2 on the transfer layer side should have arithmetic average roughness Ra of 0.04 μm or less according to JIS B0601:1994 at a cutoff value of 0.25 mm. Ra of the release substrate 2 can be measured by the same approach as that for Ra of the release substrate 1.

The release substrate 1 is peeled before transfer and does not remain at the time of transfer, whereas the release substrate 2 remains at the time of transfer. Thus, it is preferred that the release substrate 2 should have favorable profile followability to an adherend. Specifically, the elongation at break of the release substrate 2 in a tensile property test in accordance with JIS K7127:1999 is preferably 70% or more, more preferably 80% or more. In the case where the release substrate 2 is stretchy, force to shrink occurs in the release substrate 2 after lamination of the release substrate 2 onto the transfer layer and facilitates peeling the release substrate 1 from the transfer layer. Thus, in the case of using stretchy release substrate 2, it is preferred to increase the peel strength 1 (which is preferably 40 mN/25 mm or more, more preferably 50 mN/25 mm or more).

The release substrate 2 preferably has an adhesive layer having a week adhesion power on its surface from the viewpoint of rendering the peel strength 2 larger than the peel strength 1 while being capable of peeled from transfer layer.

For the adhesive contained in the adhesive layer on the surface of the release substrate 2, it is preferred to use an adhesive having a weak adhesion power such that the peel strength 2 falls within the aforementioned range.

The release substrate 2 may have an antistatic layer from the viewpoint of suppressing peeling charge.

The thickness of the release substrate 2 is not particularly limited and is preferably 5 to 100 μm, more preferably 10 to 80 μm, further preferably 20 to 70 μm, from the viewpoint of handleability after peeling of the release substrate 1 and profile followability to an adherend. The upper limit value is more preferably 60 μm or less, most preferably 45 μm or less, because the whole transfer sheet B is flexible and is readily used in transfer to a 3D form, etc.

Hereinafter, effects of the transfer sheet A obtained by the method for manufacturing a transfer sheet of the present invention will be described.

The transfer sheet A is used as described below.

Figure 3:
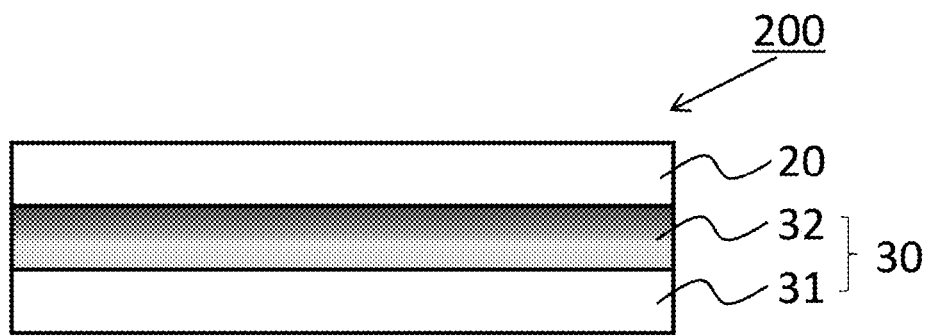
FIG. 3 is a cross-sectional view showing one embodiment of release sheet B of the present invention.
Figure 4:
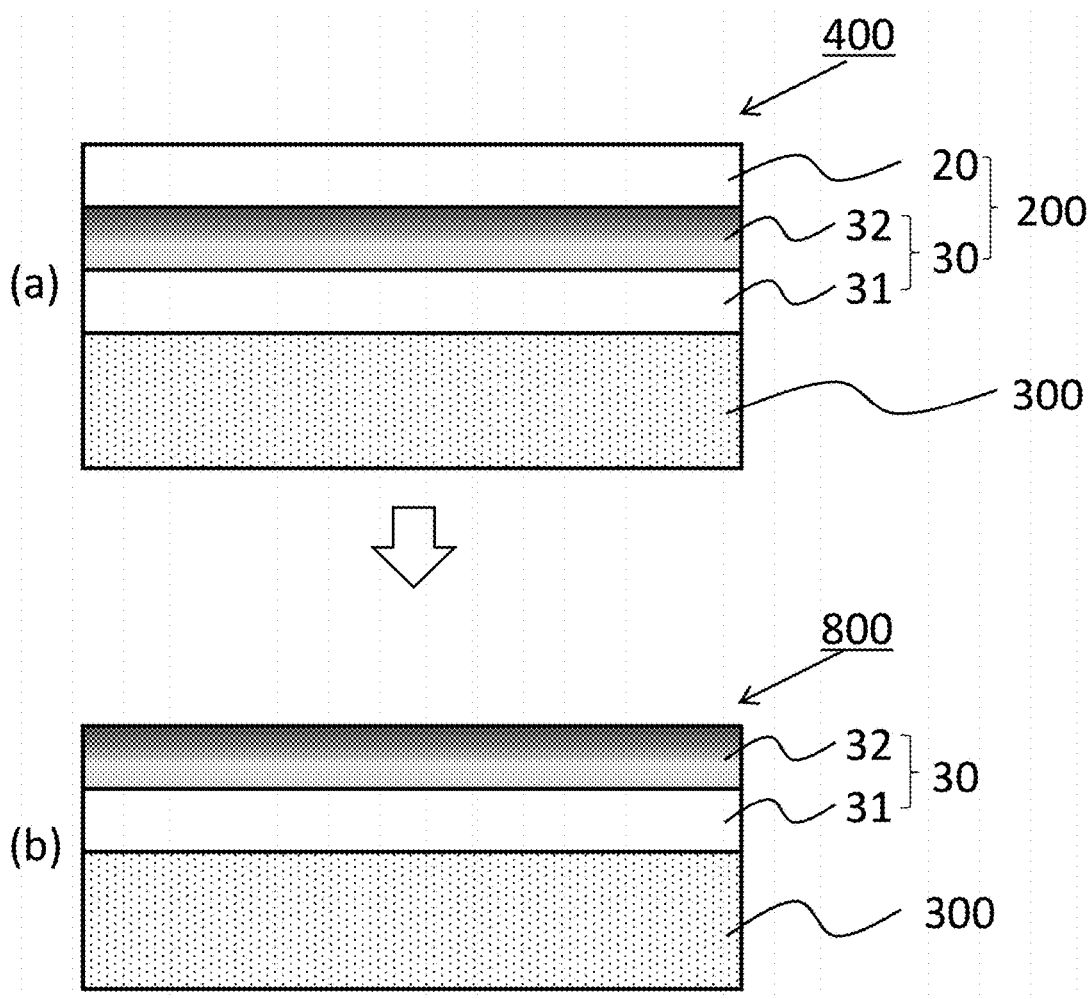
FIG. 4 (a)-(b) is a cross-sectional view showing one embodiment of each step of the method for manufacturing a molded body of the present invention.

First, the release substrate 1 is peeled from the transfer sheet A before transfer to obtain a transfer sheet B (200) shown in FIG. 3. Then, as shown in FIG. 4(*a*), the surface of the transfer sheet B on the transfer layer side is adhered to an adherend to obtain a laminate C (400). Then, as shown in FIG. 4(*b*), the release substrate 2 is peeled from the laminate C to obtain a molded body 800 prepared by transferring the transfer layer onto the adherend.

The orientation of the functional layer 1 (31) and the functional layer 2 (32) in the thickness direction in FIG. 4(*b*) is the same as that of the functional layer 1 (31) and the functional layer 2 (32) of the transfer layer in the thickness direction in FIG. 1. In other words, the upper side in the thickness direction of the functional layer 1 (31) and the functional layer 2 (32) in FIG. 4(*b*) is in the same direction as that of the functional layer 1 (31) and the functional layer 2 (32) in FIG. 1.

In the case of forming a functional layer on an arbitrary substrate, the function of the functional layer may be nearly uniform in the thickness direction. However, in many cases, the function of the functional layer is unevenly distributed in the thickness direction. In other words, the functional layer often differs in function between its surface side and substrate side. A usual functional coating material is designed so as to sufficiently exert its function on the surface side of the functional layer. Thus, the upper side in the thickness direction of the functional layer 1 (31) and the functional layer 2 (32) in FIG. 4(*b*) in the same direction as that of the functional layer 1 (31) and the functional layer 2 (32) in FIG. 1 means that the functional layers in the molded body of FIG. 4(*b*) easily exert a sufficient function. For example, in the functional layer 2 (32) in both FIG. 1 and FIG. 4(*b*), the functional component is unevenly distributed on the surface side (the upper side in FIG. 1 and FIG. 4(b)) (darker color of the functional layer 2 (32) means that the density of the functional component is higher and the functional component is more unevenly distributed), and the functional layer 2 (32) is capable of exerting a sufficient function.

Figure 5:
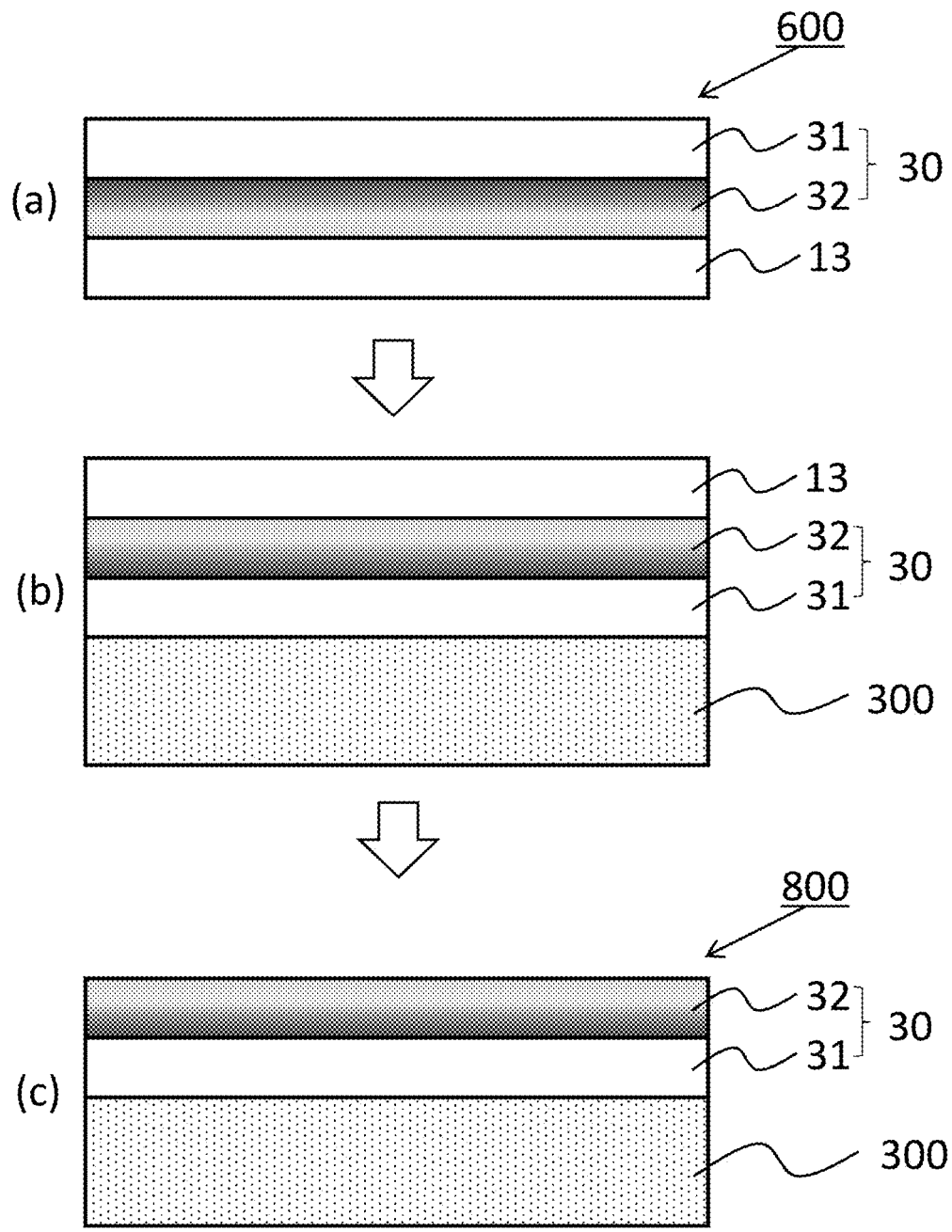
FIG. 5 (a)-(c) is a cross-sectional view showing one example of a conventional transfer sheet and a cross-sectional view showing one example of a method for manufacturing a molded body using the transfer sheet.

On the other hand, a conventional transfer sheet has a cross-sectional configuration, for example, as shown in FIG. 5(a). The conventional transfer sheet of FIG. 5(a) has a transfer layer 30 on a release substrate 13, and the transfer layer 30 has a functional layer 2 (32) and a functional layer 1 (31) from the release substrate side.

For the conventional transfer sheet, as shown in FIG. 5(b), the surface of the transfer sheet on the transfer layer side is adhered to an adherend to obtain a laminate. Then, as shown in FIG. 5(c), the release substrate 13 is peeled from the laminate to obtain a molded body 800 prepared by transferring the transfer layer onto the adherend.

The orientation of the functional layer 1 (31) and the functional layer 2 (32) in the thickness direction in FIG. 5(c) is different from that of the functional layer 1 (31) and the functional layer 2 (32) of the transfer layer in the thickness direction in FIG. 5(a). In other words, the upper side in the thickness direction of the functional layer 1 (31) and the functional layer 2 (32) in FIG. 5(c) corresponds to the lower side in the thickness direction of the functional layer 1 (31) and the functional layer 2 (32) in FIG. 5(a).

Thus, in transfer using the conventional transfer sheet, the functional layer is less likely to exert a sufficient function because the thickness direction of the functional layer formed on the release substrate and the thickness direction of the functional layer transferred to an adherend are in reverse. For example, the functional layer 2 (32) in the molded body 800 of FIG. 5(c) cannot exert a sufficient function because the functional component of the functional layer 2 (32) is unevenly distributed on the side opposite to the surface (the lower side in FIG. 5(c)).

As described above, the transfer sheet A obtained by the method for manufacturing a transfer sheet of the present invention can impart a sufficient function to a molded body.

The aforementioned uneven distribution of the function is prominent when the functional layer is an anti-glare layer or an antifouling layer. Accordingly, the method for manufacturing a transfer sheet of the present invention is suitable when at least one functional layer is an anti-glare layer or an antifouling layer, because of more easily exerting effects. Particularly, it is preferred that at least one functional layer should be an antifouling low refractive index layer.

In the case of the configuration of a conventional transfer sheet, it cannot impart sufficient anti-glare performance and antifouling properties to an adherend for reasons described below, even if the transfer layer includes an anti-glare layer and an antifouling layer.

First of all, in the case where the conventional transfer sheet comprises an anti-glare layer as a transfer layer, the surface profile of the anti-glare layer transferred to an adherend has a profile nearly complementary to the surface profile of a release sheet. Since the surface profile of the release sheet is usually smoothened for favorable releasability from the transfer layer, the surface profile of the anti-glare layer transferred to an adherend has no asperity shape and can no longer confer sufficient anti-glare performance. For example, in the case where the functional layer 2 (32) of FIG. 5(a) is an anti-glare layer and the functional layer 1 (31) is an adhesive layer, the surface profile of the functional layer 2 (32, anti-glare layer) of FIG. 5(c) has a profile complementary to the surface profile of the release substrate 13 and is less likely to confer anti-glare performance brought about by surface asperity.

In the case of forming an antifouling layer containing an antifouling agent on a substrate, the antifouling agent tends to accumulate on an air interface having low surface energy. For example, in the case where the functional layer 2 (32) of FIG. 5(a) is an antifouling layer and the functional layer 1 (31) is an adhesive layer, the functional component (antifouling agent) on the surface side of the functional layer 2 (32, antifouling layer) of FIG. 5(c) is of a low proportion and can no longer confer sufficient antifouling properties.

<Step (3)>

It is preferred that the method for manufacturing a transfer sheet of the present invention should further perform the following step (3):

(3) peeling the release substrate 1 from the transfer sheet A to obtain a transfer sheet B comprising the transfer layer on the release substrate 2.

In the step (3), the release substrate 1 is peeled from the transfer sheet A obtained in the step (2).

The release substrate 1 also has a role in protecting the transfer layer in cutting or transporting the transfer sheet and is an unnecessary material at the time of transfer. Thus, it is preferred to peel the release substrate 1 before transfer, as shown in the step (3).

[Method for Manufacturing Molded Body]

The method for manufacturing a molded body of the present invention comprises performing the following steps (4) to (5) in order:

(4) adhering the surface of the transfer sheet B on the transfer layer side to an adherend to obtain a laminate C; and (5) peeling the release substrate 2 from the laminate C to obtain a molded body comprising a transfer layer on the adherend.

The step (4) is the step of adhering the surface of the transfer sheet B on the transfer layer side to an adherend to obtain a laminate C (400) (FIG. 4(a)).

In the step (4), an approach of adhering the surface of the transfer sheet B on the transfer layer side to an adherend is not particularly limited. For example, in the case where a layer positioned most distant from the release substrate 2 among layers constituting the transfer layer exhibits adhesiveness (preferably heat-sensitive adhesiveness), the transfer layer can be adhered to an adherend through the use of the adhesiveness of the layer. In the case of in-mold molding, the transfer layer can be adhered to an adherend by using a resin having high adherence to the transfer layer as an injection resin (≈the adherend). Alternatively, the transfer layer can be adhered to an adherend via a double-faced adhesive sheet.

<Adherend>

Examples of the material of the adherend include, but are not particularly limited to, one member selected from the group consisting of inorganic materials such as glass and ceramics, and a resin, and mixtures thereof.

In the case of performing in-mold molding, it is preferred to use an injection-moldable thermoplastic resin or thermosetting resin as the adherend. Among them, it is more preferred to use a thermoplastic resin.

Examples of the thermoplastic resin include polystyrene resin, polyolefin resin, ABS resin (including heat-resistant ABS resin), AS resin, AN resin, polyphenylene oxide resin, polycarbonate resin, polyacetal resin, acrylic resin, polyethylene terephthalate resin, polybutylene terephthalate resin, polysulfone resin, and polyphenylene sulfide resin.

The shape of the adherend is not particularly limited and may be a tabular shape or may be a three-dimensional shape. The thickness of the adherend is not particularly limited.

The adherend may be previously formed or may be formed during the step (4) as in in-mold molding.

The step (5) is the step of peeling the release substrate 2 (20) from the laminate C (400) to obtain a molded body comprising the transfer layer 30 on the adherend 300 (FIG. 4(*b*)).

In the steps (4) and (5), a known transfer method can be used.

Examples thereof include: (i) a method of preparing a laminate C in which a surface of a transfer sheet B on the transfer layer side is adhered to a previously formed adherend, and peeling a release substrate 2 from the laminate C; (ii) a method of preparing a laminate C in which a surface of a transfer sheet B on the transfer layer side is adhered to a tabular adherend, and peeling a release substrate 2 from the laminate C; and (iii) a method of preparing a laminate C in which a surface of a transfer sheet B on the transfer layer side is integrated (adhered) with an adherend while the adherend is formed by injection-molding, and peeling a release substrate 2 from the laminate C [in-mold molding (simultaneous injection-molding and transfer decoration method)].

One embodiment of the in-mold molding includes a process having the following steps (a) to (d):
  (a) arranging the surface of a transfer sheet B on the transfer layer side toward the inside of the mold for in-mold molding;
  (b) injecting a resin into the mold for in-mold molding;
  (c) integrating (adhering) the resin with the transfer sheet B on the transfer layer side to obtain a laminate C; and
  (d) taking out the laminate C from the mold, and then peeling the release substrate 2 from the laminate C.

[Transfer Sheet A]

The transfer sheet A of the present invention comprises a release substrate 1, a transfer layer and a release substrate 2 in the presented order and has a peel strength 2 between the release substrate 2 and the transfer layer larger than a peel strength 1 between the release substrate 1 and the transfer layer, the transfer layer comprising at least one functional layer, wherein the function of at least one of the functional layer(s) is unevenly distributed on the release substrate 2 side.

Embodiments of the release substrate 1 and the release substrate 2 and the peel strength 1 and the peel strength 2 in the transfer sheet A of the present invention are the same as those of the release substrate 1 and the release substrate 2 and the peel strength 1 and the peel strength 2 for use in the aforementioned method for manufacturing a transfer sheet of the present invention. For example, the difference between the peel strength 2 and the peel strength 1 (peel strength 2−peel strength 1) is preferably 15 mN/25 mm or more, more preferably 40 mN/25 mm or more, further preferably 100 mN/25 mm or more. The difference is preferably 450 mN/25 mm or less, more preferably 350 mN/25 mm or less, further preferably 300 mN/25 mm or less, still further preferably 200 mN/25 mm or less.

An embodiment of the transfer layer in the transfer sheet A of the present invention is the same as that of the transfer layer in the aforementioned method for manufacturing a transfer sheet of the present invention. Hereinafter, the uneven distribution of the function will be further described.

The transfer layer in the transfer sheet A of the present invention comprises at least one functional layer, and the function of at least one of the functional layer(s) is unevenly distributed on the release substrate 2 side. When the function of at least one functional layer contained in the transfer layer is unevenly distributed on the release substrate 2 side, a molded body obtained by obtaining a transfer sheet B by the peeling of the release substrate 1 and transferring the transfer layer of the transfer sheet B to an adherend can sufficiently exert the function of the functional layer which is unevenly distributed on the release substrate 2 side. In the case where the functional layer is a single layer, the function may be unevenly distributed on the release substrate 2 side within the single layer. In the case where the transfer layer has two or more functional layers, it is preferred that the function of the functional layer positioned on the side closest to the release substrate 2 should be unevenly distributed.

As mentioned above, it is difficult for a conventional transfer sheet to sufficiently exert the functions of an anti-glare layer and an antifouling layer. Thus, the transfer sheet A of the present invention is suitable when the functional layer, the function of which is unevenly distributed on the release substrate 2 side, is an anti-glare layer or an antifouling layer, because of more easily exerting effects. Particularly, it is preferred that at least one functional layer should be an antifouling low refractive index layer.

The uneven distribution of the function in the functional layer can be evaluated from the concentration of the functional component and a cross-sectional profile, etc.

For example, as for the concentration of the functional component, the uneven distribution of the function can be evaluated by comparing a concentration (X2) of the functional component contained in the functional layer at the interface with the release substrate 2 with a concentration (X1) of the functional component contained in the functional layer in the surface on the side opposite to the release substrate 2 (at the interface with the release substrate 1). In this respect, for example, X2/X1 of 10 or more (preferably X2/X1 of 20 or more, more preferably X2/X1 of 50 or more) can be used as a reference for the uneven distribution of the function. More specifically, in the case where the functional layer is an antifouling layer and the functional component that exerts antifouling properties is a fluorine component, the proportion of fluorine atom of the functional layer at the interface with the release substrate 2 and the proportion of fluorine atom of the functional layer at the interface with the release substrate 1 can be quantitatively analyzed by X-ray photoelectron spectroscopy (XPS) to confirm that the function (antifouling properties) is unevenly distributed.

The uneven distribution of the functional component can also be evaluated by comparing the physical properties of a molded body obtained by the method for manufacturing a molded body of the present invention (for example, a molded body obtained by the steps of FIG. 4) with the physical properties of a molded body obtained by a conventional method for manufacturing a molded body (for example, a molded body obtained by the steps of FIG. 5) on the assumption that the formulation of the transfer layer is the same therebetween. Examples of the physical properties to be compared include water contact angle, pencil hardness, and reflectance.

As for the cross-sectional profile, the uneven distribution of the function can be evaluated, for example, by picturing a cross section of the functional layer cut in the perpendicular direction under a scanning electron microscope (STEM), and comparing a length (L2) of the ridge line on the surface of the functional layer on the release substrate 2 side with a length (L1) of the ridge line on the surface of the functional layer on the side opposite to the release substrate 2 (on the release substrate 1 side). For example, in the case where the functional layer is an anti-glare layer, a longer ridge line means that the surface of the functional layer has more asperity and the function (anti-glare performance) is more sufficiently exerted. Longer L2 than L1 can be used as a reference for the uneven distribution of the function (anti-glare performance). L2/L1 differs depending on the strength of the anti-glare performance to be conferred and therefore cannot be generalized. It is preferably 1.001 or more, more preferably 1.002 or more. In the case where an average tilt angle on the L2 side is 3 degrees and an average tilt angle on the L1 side is 0 degrees, L2/L1 is 1.00137. In the case where the average tilt angle on the L2 side is 5 degrees and the average tilt angle on the L1 side is 0 degrees, L2/L1 is 1.00382.

In the case where the functional layer positioned closest to the release substrate 2 side among functional layers is an anti-glare layer, the uneven distribution of the function (anti-glare performance) can also be confirmed by measuring the surface profile of the anti-glare layer after transfer to an adherend. Specifically, when arithmetic average roughness Ra of the anti-glare layer surface according to JIS B0601:1994 at cutoff value of 0.25 mm is 0.05 μm or more, it can be said that the function of the anti-glare layer is unevenly distributed. In the case where the release substrate 2 remains and its Ra on the transfer layer side is in a measurable state, it can be said from the satisfied relationship of Ra of the release substrate 2<Ra of the anti-glare layer surface that the function of the anti-glare layer is unevenly distributed.

Examples of the anti-glare layer include a type that confers surface asperity by particles and a type that confers surface asperity by the phase separation of resins. In the present embodiment, L2/L1 can easily fall within the aforementioned range even when any of the types are used.

The transfer sheet A may be in the form of a single sheet cut to a predetermined size, or may be in the form of a roll obtained by winding a long sheet to a roll. The size of the single sheet is not particularly limited, and the maximum size is about 2 to 500 inches. The "maximum size" refers to the maximum length in connecting of arbitrary two points of the transfer sheet A. For example, in a case where the transfer sheet A has a rectangular shape, the diagonal line of the region of such a shape corresponds to the maximum size. In a case where the transfer sheet A has a round shape, the diameter corresponds to the maximum size.

The width and the length of the roll are not particularly limited, and in general, the width is 200 to 3000 mm and the length is about 100 to 5000 m. The transfer sheet A in the form of the roll can be cut to a single sheet shape tailored to the size of an adherend. An end portion of the roll, where properties are not stable, is preferably excluded in the cutting.

The shape of the single sheet is also not particularly limited, and may be, for example, a polygonal shape (triangular shape, quadrangular shape, pentagonal shape, or the like) or a round shape, or may be a randomly irregular shape.

[Transfer Sheet B]

The transfer sheet B of the present invention comprises a transfer layer on a release substrate 2, the transfer layer comprising at least one functional layer, wherein the function of at least one of the functional layer(s) is unevenly distributed on the release substrate 2 side.

As mentioned above, it is difficult for a conventional transfer sheet to sufficiently exert the functions of an anti-glare layer and an antifouling layer. Thus, the transfer sheet B of the present invention is suitable when the functional layer, the function of which is unevenly distributed on the release substrate 2 side, is an anti-glare layer or an antifouling layer, because of more easily exerting effects. Particularly, it is preferred that at least one functional layer should be an antifouling low refractive index layer.

The transfer sheet B of the present invention can be obtained by peeling the release substrate 1 of the aforementioned transfer sheet A of the present invention.

[Molded Body]

The molded body of the present invention comprises a transfer layer on an adherend, the transfer layer comprising at least one functional layer, wherein the function of at least one of the functional layer(s) is unevenly distributed on the side opposite to the adherend.

An embodiment of the adherend constituting the molded body of the present invention is the same as that of the adherend for use in the aforementioned method for manufacturing a molded body of the present invention. Examples of the adherend include one member selected from the group consisting of glass, ceramics and a resin, and mixtures thereof.

The molded body of the present invention is preferred when the adherend is glass, because of easily conferring the high quality and cool touch of glass. This effect can be more easily exerted when the functional layer, the function of which is unevenly distributed on the side opposite to the adherend, is a low refractive index layer. The effect can be even more easily exerted when any one of the following conditions is satisfied: (a) the Si element ratio and C/Si of the low refractive index layer fall within the aforementioned ranges and (b) the low refractive index layer exhibits antifouling properties and its pure water contact angle falls within the aforementioned range. The effect can be further even more easily exerted when both the conditions (a) and (b) are satisfied. In recent years, the high quality and texture of glass have been emphasized for increase in size, the design of narrow bezels, 3D shape (particularly, 3D shape is pursued for vehicle purposes), etc. of image display devices. Thus, the molded body of the present invention is useful.

An embodiment of the transfer layer constituting the molded body of the present invention is the same as that of the transfer layer for use in the aforementioned method for manufacturing a transfer sheet of the present invention.

The transfer layer constituting the molded body of the present invention comprises at least one functional layer, and the function of at least one of the functional layer(s) is unevenly distributed on the side opposite to the adherend. The uneven distribution of the function is as described about the transfer sheet A of the present invention. For example, the functional layer, the function of which is unevenly distributed on the side opposite to the adherend, is preferably an anti-glare layer, an antifouling layer or an antifouling low refractive index layer. Preferably, the antifouling low refractive index layer comprises a binder resin and silica particles, and a ratio of Si element attributed to the silica particles is 10.0 atomic percent or more and 18.0 atomic percent or less and a ratio of C element under the assumption that the ratio of Si element is defined to be 100 atomic percent is 180 atomic percent or more and 500 atomic percent or less, obtained by analysis of a surface region of the antifouling low refractive index layer by X-ray photoelectron spectroscopy.

As mentioned above, it is difficult for a molded body prepared using a conventional transfer sheet to sufficiently exert anti-glare performance and antifouling properties as functions by an anti-glare layer and an antifouling layer contained in a transfer layer. Thus, the molded body of the present invention is suitable when the functional layer, the function of which is unevenly distributed on the side opposite to the adherend, is an anti-glare layer or an antifouling layer, because of more easily exerting effects. Particularly, it is preferred that at least one functional layer should be an antifouling low refractive index layer.

In the molded body of the present invention, the layer positioned closest to the adherend among layers constituting the transfer layer is preferably an adhesive layer from the viewpoint of the adherence between the adherend and the transfer layer. An embodiment of the adhesive layer is the same as that of the adhesive layer listed for the aforementioned method for manufacturing a transfer sheet of the present invention.

In the molded body of the present invention, preferably, the adherend is glass, and the layer positioned closest to the adherend among layers constituting the transfer layer comprises a resin having one or more functional groups selected from the group consisting of a carboxyl group and a methoxy group. This configuration can facilitate improving the adherence between the adherend glass and the transfer layer.

The ratio of the resin having one or more functional groups selected from the group consisting of a carboxyl group and a methoxy group to all resin components of the layer positioned closest to the adherend is preferably 50% by mass or more, more preferably 70% by mass or more, further preferably 90% by mass or more, still further preferably 95% by mass or more, most preferably 100% by mass.

In the case where the material of the adherend is acrylic resin, the layer positioned closest to the adherend among layers constituting the transfer layer preferably contains acrylic resin. In the case where the material of the adherend is any member selected from the group consisting of modified polyphenylene oxide, polycarbonate resin and styrene resin, the layer positioned closest to the adherend among layers constituting the transfer layer preferably contains one or more members selected from the group consisting of acrylic resin, polystyrene resin, polyamide resin and polyester resin. In the case where the material of the adherend is polypropylene resin, the layer positioned closest to the adherend among layers constituting the transfer layer preferably contains one or more members selected from the group consisting of chlorinated polyolefin resin, chlorinated ethylene-vinyl acetate copolymer resin, cyclic rubber and coumarone-indene resin.

In the case where the transfer layer transferred to an adherend comprises a low refractive index layer, the molded body preferably has a luminous reflectance Y value of 2.0% or less, more preferably 1.0% or less, more preferably 0.5% or less, more preferably 0.2% or less, as measured at an incident angle of light of 5 degrees from the side having the low refractive index layer.

In this description, the luminous reflectance Y value refers to the luminous reflectance Y value of the CIE 1931 standard colorimetric system. The luminous reflectance Y value can be calculated with a spectral photometer (for example, manufactured by Shimadzu Corp., trade name "UV-2450"). In the case where the adherend has light transmissivity, it is preferred to prepare a sample in which a light-blocking black plate is adhered to the back of the adherend via a pressure-sensitive adhesive layer, and measure the luminous reflectance Y value of the sample.

[Front Plate for Image Display Device]

The front plate for an image display device of the present invention comprises the aforementioned molded body of the present invention.

It is preferred that the front plate of the present invention should be used such that its surface on the transfer layer side faces the front surface of an image display device.

The front plate may be in the form of a single sheet cut to a predetermined size. The size of the single sheet is not particularly limited, and the maximum size is about 2 to 500 inches. The "maximum size" refers to the maximum length in connecting of arbitrary two points of the front plate. For example, in a case where the front plate has a rectangular shape, the diagonal line of the region of such a shape corresponds to the maximum size. In a case where the front plate has a round shape, the diameter corresponds to the maximum size.

The shape of the single sheet is also not particularly limited, and may be, for example, a polygonal shape (triangular shape, quadrangular shape, pentagonal shape, or the like) or a round shape, or may be a randomly irregular shape.

[Image Display Device]

The image display device of the present invention is an image display device comprising a front plate on a display element, wherein the front plate is the aforementioned molded body of the present invention.

Examples of the display element include liquid-crystal display elements, EL display elements (organic EL display elements and inorganic EL display elements), and plasma display elements and further include LED display elements such as micro LED display elements. Such a display element may have a touch panel function inside the display element.

Examples of the liquid-crystal display system of the liquid-crystal display element include IPS systems, VA systems, multidomain systems, OCB systems, STN systems, and TSTN systems. In the case where the display element is a liquid-crystal display element, a backlight is necessary. The backlight is arranged on the side opposite to the side having the molded body in the liquid-crystal display element.

The image display device may be an image display device with a touch panel.

It is preferred that the front plate should be arranged such that its surface on the transfer layer side faces the side opposite to the display element.

The size of the image display device is not particularly limited, and the maximum size is about 2 to 500 inches. The "maximum size" refers to the maximum length in connecting of arbitrary two points of the image display device. For example, in a case where the image display device has a rectangular shape, the diagonal line of the region of such a shape corresponds to the maximum size. In a case where the image display device has a round shape, the diameter corresponds to the maximum size.

The shape of the image display device is not particularly limited, and may be, for example, a polygonal shape (triangular shape, quadrangular shape, pentagonal shape, or the like) or a round shape, or may be a randomly irregular shape.

EXAMPLES

Hereinafter, the present invention will be specifically described with reference to Examples and Comparative Examples. However, the present invention is not limited to modes described in Examples.

1. Evaluation and Measurement on Uneven Distribution of Function

The molded bodies obtained in Examples 1-1 to 1-3 and Comparative Examples 1-1 to 1-3 were measured and evaluated in the following manners. The results are shown in Table 1. The sizes of the molded bodies used in the following measurement and evaluation are given as one example and are not limited to them.

The atmosphere in each measurement and each evaluation was at a temperature of 23° C.±5° C. and a humidity of 40 to 65%. A molded body was exposed to the atmosphere for 30 minutes or more before the start of each measurement and each evaluation, and then subjected to each measurement and each evaluation.

1-1. Antifouling Properties (Water Contact Angle)

A glass plate with double-faced tape was prepared in which double-faced tape (751B, manufactured by Teraoka Seisakusho Co., Ltd.) was adhered to 10×10 cm soda glass. The release substrate 1 of the transfer sheet A of each of Examples 1-1 to 1-3 was peeled to prepare a transfer sheet B. A 10×10 cm laminate was obtained in which the surface of the transfer sheet B on the adhesive layer side was adhered to the double-faced tape-attached surface of the glass plate. The release substrate 2 was peeled from the laminate. Using a contact angle meter (DM-300, manufactured by Kyowa Interface Science Co., Ltd.), 1.0 μL of pure water was added dropwise to the surface of the transfer layer (the surface of the antifouling low refractive index layer), and a static contact angle was measured according to the θ/2 method 10 seconds after dropwise addition. The measurement was performed three times, and an average value therefrom was regarded as the water contact angles of Examples 1-1 to 1-3. The results are shown in Table 1.

A laminate was obtained in which the surface of the transfer sheet of each of Comparative Examples 1-1 to 1-3 on the adhesive layer side was adhered to the double-faced tape-attached surface of the glass plate. The release substrate was peeled from the laminate. Using a contact angle meter (DM-300, manufactured by Kyowa Interface Science Co., Ltd.), 1.0 μL of pure water was added dropwise to the surface of the transfer layer (the surface of the antifouling low refractive index layer), and a static contact angle was measured according to the θ/2 method 10 seconds after dropwise addition. The measurement was performed three times, and an average value therefrom was regarded as the water contact angles of Comparative Examples 1-1 to 1-3. The results are shown in Table 1.

1-2. Antifouling Properties (Oil-Based Pen Writability and Erasability)

An A4 white mount was placed on a flat table, and four sides of the 10×10 cm laminate prepared in the aforementioned section 1-1 were fixed on the mount with mending tape (manufactured by 3M Company, trade name "810-3-18") such that the antifouling low refractive index layer surface was turned up. Subsequently, three lines of 5 mm or more in width and 5 cm in length were written at 2 cm intervals on the antifouling low refractive index layer surface with a black oil-based pen (trade name "Hi-Mckee", manufactured by Zebra Co., Ltd., part number MO-150-MC) on the boldface side, and then erased. Writability and erasability were evaluated according to the criteria described below. As comprehensive evaluation of writability and erasability, antifouling properties were evaluated according to the criteria described below. The results of evaluating the antifouling properties are shown in Table 1.

<Writability>

After a lapse of 30 seconds from writing, whether or not the three lines were repelled was visually observed. When two or more of the three lines were repelled, the pen was evaluated as being repelled. When the line failed to maintain its shape and was thus deformed or the line width or length shrunk, the pen was regarded as being repelled.

<Erasability>

Ten seconds after visual evaluation of the writability, the three lines were wiped off with waste cloth (trade name "KimWipes", manufactured by Nippon Paper Crecia Co., Ltd., part number: S-200), and the number of wiping-off operations was evaluated until the black ink of the pen was no longer visible.

<<Antifouling Properties>>

A: The pen was repelled and was able to be wiped off by one wiping-off operation.

B: The pen was not repelled, but was able to be wiped off by 2 to 5 wiping-off operations.

C: The pen was neither repelled nor was able to be wiped off even by 5 operations.

2. Preparation of Transfer Sheet and Molded Body

Example 1-1

Coating liquid 1 for forming an adhesive layer (an adhesive layer having heat sealing properties) having the formulation given below was applied onto a polyethylene terephthalate film of 38 μm in thickness and 200 mm×600 mm in size having a surface subjected to release treatment (release substrate 1), and dried (100° C., 60 sec) to form an adhesive layer of 2 μm in thickness.

Subsequently, coating liquid 1 for forming a hardcoat layer having the formulation given below was applied onto the adhesive layer, and dried (70° C., 30 sec) to form a coating film, which was then irradiated with ultraviolet ray from the hardcoat layer side so that the ionizing radiation-curable composition was cured to form a hardcoat layer of 5 μm in thickness.

Subsequently, coating liquid 1 for forming an antifouling low refractive index layer having the formulation given below was applied onto the hardcoat layer, dried (50° C., 60 sec) and irradiated with ultraviolet ray to form an antifouling low refractive index layer of 100 nm in thickness having a refractive index of 1.30.

Subsequently, a release substrate 2 (manufactured by Sun A. Kaken Co., Ltd., trade name "SAT TS1050TRL") having a pressure-sensitive adhesive layer on a polyethylene terephthalate film of 50 μm in thickness was provided, and the surface of the release substrate 2 on the adhesive layer side was adhered to the antifouling low refractive index layer to obtain a transfer sheet A of Example 1-1. The transfer sheet A of Example 1-1 had the release substrate 1, the adhesive layer, the hardcoat layer, the antifouling low refractive index layer and the release substrate 2 in the presented order.

The release substrate 1 of the obtained transfer sheet A was peeled to obtain a transfer sheet B of Example 1-1. The release substrate 1 was able to be peeled from the transfer sheet A with the release substrate 2 remaining. This indicates that the transfer sheet A had a peel strength 2 larger than a peel strength 1.

Subsequently, the surface of the transfer sheet B on the adhesive layer side was put on an adherend (polycarbonate resin plate (manufactured by Sumitomo Bakelite Co., Ltd., trade name "ECK 100UU", thickness: 2 mm)), followed by heat transfer from the release substrate side of the transfer sheet using a roll type hot stamp machine (manufactured by Navitas Machinery Co., Ltd., trade name "RH-300") under conditions involving a roll temperature of 220 to 240° C. and a roll speed of 20 mm/s.

Subsequently, the release substrate 2 of the transfer sheet B was peeled to obtain a molded body of Example 1-1. The molded body of Example 1-1 had the adherend, the adhesive layer, the hardcoat layer and the antifouling low refractive index layer in the presented order.

<Coating Liquid 1 for Forming Adhesive Layer>

| | |
|---|---|
| Acrylic resin (manufactured by Mitsubishi Chemical Corp., trade name "Mytech UC026", active ingredient: 40% by mass, methyl ethyl ketone solvent) | 23.0 parts by mass |
| Methyl ethyl ketone | 74.0 parts by mass |

<Coating Liquid 1 for Forming Hardcoat Layer>

| | |
|---|---|
| Photopolymerization initiator (manufactured by BASF SE, trade name "Omnirad 184") | 0.5 parts by mass |
| Reactive acrylic polymer (active ingredient: 35% by mass, methyl ethyl ketone/ 2,6-di-tertiary butyl-4-cresol mixed solvent) | 30.0 parts by mass |
| Multifunctional urethane acrylate resin (manufactured by DIC Corp., trade name: LUXYDIR ERS-543, active ingredient: 80% by mass, toluene solvent) | 5 parts by mass |
| Zirconium dioxide (active ingredient: 70% by mass, methyl ethyl ketone solvent, average particle size: 11 nm) | 9.0 parts by mass |
| Leveling agent (manufactured by DIC Corp., trade name "MEGAFACE F-560", active ingredient: 20% by mass) | 0.2 parts by mass |
| Diluting solvent (2:8 mixed solvent of methyl isobutyl ketone and methyl ethyl ketone) | 55.3 parts by mass |

<Coating Liquid a for Forming Antifouling Low Refractive Index Layer>

| | |
|---|---|
| Photopolymerization initiator (manufactured by IGM Resins B.V., trade name "Omnirad 127") | 0.1 parts by mass |
| Ultraviolet ray-curable resin (Tri- or tetrafunctional alkoxylated pentaerythritol acrylate, manufactured by Shin-Nakamura Chemical Co., Ltd., trade name "NK ester ATM-4PL") | 1.1 parts by mass |
| Hollow silica (average particle size: 60 nm) | 6.3 parts by mass (active ingredient: 1.3 parts by mass) |
| Solid silica (average particle size: 12 nm) | 0.9 parts by mass (active ingredient: 0.3 parts by mass) |
| Fluorine-based antifouling agent (manufactured by DIC Corp., trade name "MEGAFACE F-568") | 0.1 parts by mass (active ingredient: 0.005 parts by mass) |
| Diluting solvent (9:1 mixed solvent of methyl isobutyl ketone and propylene glycol monomethyl ether acetate) | 91.5 parts by mass |

Example 1-2

Transfer sheet A, transfer sheet B and a molded body of Example 1-2 were obtained in the same manner as in Example 1-1 except that in the coating liquid A for forming an antifouling low refractive index layer of Example 1-1, "0.1 parts by mass of the fluorine-based antifouling agent (manufactured by DIC Corp., trade name "MEGAFACE F-568")" were changed to a "mixture of 0.005 parts by mass of a silicone-based antifouling agent (manufactured by BYK Japan KK, trade name "BYK-W3510", active ingredient: 100% by mass) and 0.095 parts by mass of methyl isobutyl ketone" to prepare coating liquid B for forming an antifouling low refractive index layer, which was used.

Example 1-3

Transfer sheet A, transfer sheet B and a molded body of Example 1-3 were obtained in the same manner as in Example 1-1 except that in the coating liquid A for forming an antifouling low refractive index layer of Example 1-1, 0.05 parts by mass in "0.1 parts by mass of the fluorine-based antifouling agent (manufactured by DIC Corp., trade name "MEGAFACE F-568")" were changed to a "mixture of 0.0025 parts by mass of a silicone-based antifouling agent (manufactured by BYK Japan KK, trade name "BYK-UV3510", active ingredient: 100% by mass) and 0.0475 parts by mass of methyl isobutyl ketone" to prepare coating liquid C for forming an antifouling low refractive index layer, which was used.

Comparative Example 1-1

Coating liquid A for forming an antifouling low refractive index layer having the aforementioned formulation was applied onto a polyethylene terephthalate film of 100 μm in thickness having a surface subjected to release treatment (release substrate, size: 200 mm×600 mm), dried (50° C., 60 sec) and irradiated with ultraviolet rays to form an antifouling low refractive index layer of 100 nm in thickness having a refractive index of 1.30.

Subsequently, coating liquid 1 for forming a hardcoat layer having the aforementioned formulation was applied onto the antifouling low refractive index layer, and dried (70° C., 30 sec) to form a coating film, which was then irradiated with ultraviolet ray from the hardcoat layer side so that the ionizing radiation-curable composition was cured to form a hardcoat layer of 5 μm in thickness.

Subsequently, coating liquid 1 for forming an anchor layer having the formulation given below was applied onto the hardcoat layer, dried at 100° C. for 1 minute and cured to form an anchor layer of 2 μm in thickness.

Subsequently, coating liquid 1 for forming an adhesive layer (an adhesive layer having heat sealing properties) having the aforementioned formulation was applied onto the anchor layer, dried at 100° C. for 1 minute and cured to form an adhesive layer of 2 μm in thickness. In this way, a transfer sheet of Comparative Example 1-1 was obtained. The transfer sheet of Comparative Example 1-1 had the release substrate, the antifouling low refractive index layer, the hardcoat layer, the anchor layer and the adhesive layer in the presented order.

Subsequently, the surface of the transfer sheet on the adhesive layer side was put on an adherend (polycarbonate resin plate (manufactured by Sumitomo Bakelite Co., Ltd., trade name "ECK 100UU", thickness: 2 mm)), followed by heat transfer from the release substrate side of the transfer sheet using a roll type hot stamp machine (manufactured by Navitas Machinery Co., Ltd., trade name "RH-300") under conditions involving a roll temperature of 220 to 240° C. and a roll speed of 20 mm/s.

Subsequently, the release substrate of the transfer sheet was peeled to obtain a molded body of Comparative Example 1-1. The molded body of Comparative Example 1-1 had the adherend, the adhesive layer, the anchor layer, the hardcoat layer and the antifouling low refractive index layer in the presented order.

<Coating Liquid 1 for Forming Anchor Layer>

| | |
|---|---|
| Isocyanate resin (active ingredient: 40%, ethyl acetate solvent) | 7.5 parts by mass |
| Polyester resin (active ingredient: 26%, toluene/ethyl acetate/methyl ethyl ketone mixed solvent) | 46.2 parts by mass |
| Diluting solvent (4:6 mixed solvent of ethyl acetate and toluene) | 46.3 parts by mass |

Comparative Example 1-2

Transfer sheets and a molded body of Comparative Example 1-2 were obtained in the same manner as in Comparative Example 1-1 except that in the coating liquid A for forming an antifouling low refractive index layer of Comparative Example 1-1, "0.1 parts by mass of the fluorine-based antifouling agent (manufactured by DIC Corp., trade name "MEGAFACE F-568")" were changed to a "mixture of 0.005 parts by mass of a silicone-based antifouling agent (manufactured by BYK Japan KK, trade name "BYK-W3510", active ingredient: 100% by mass) and 0.095 parts by mass of methyl isobutyl ketone" to prepare coating liquid B for forming an antifouling low refractive index layer, which was used.

Comparative Example 1-3

Transfer sheets and a molded body of Comparative Example 1-3 were obtained in the same manner as in Comparative Example 1-1 except that in the coating liquid A for forming an antifouling low refractive index layer of Comparative Example 1-1, 0.05 parts by mass in "0.1 parts by mass of the fluorine-based antifouling agent (manufactured by DIC Corp., trade name "MEGAFACE F-568")" were changed to a "mixture of 0.0025 parts by mass of a silicone-based antifouling agent (manufactured by BYK Japan KK, trade name "BYK-UV3510", active ingredient: 100% by mass) and 0.0475 parts by mass of methyl isobutyl ketone" to prepare coating liquid C for forming an antifouling low refractive index layer, which was used.

Examples 1-1 to 1-3 in which the component of the antifouling agent serving as a functional component was unevenly distributed on the side opposite to the adherend.

3. Comparison of Oil Dust Resistance, Etc. Of Antifouling Low Refractive Index Layer 3-1. Preparation of Transfer Sheet and Molded Body Example 2-1

Transfer sheet A, transfer sheet B and a molded body of Example 2-1 were obtained in the same manner as in Example 1-1 except that the coating liquid A for forming an antifouling low refractive index layer of Example 1-1 was changed to coating liquid D for forming an antifouling low refractive index layer having the formulation given below and drying conditions were changed to 60° C. for 1 minute. The low refractive index layer of Example 2-1 had a refractive index of 1.33.

<Coating Liquid D for Forming Antifouling Low Refractive Index Layer>

| | |
|---|---|
| Photopolymerization initiator (manufactured by IGM Resins B.V., trade name "Omnirad 127") | 0.02 parts by mass |
| Ultraviolet ray-curable resin (polyethylene glycol (n ≈ 4) diacrylate, manufactured by Toagosei Co., Ltd., trade name "M-240") | 0.6 parts by mass |
| Hollow silica (hollow silica surface-treated with a silane coupling agent having a methacryloyl group, average particle size: 75 nm; dispersion having 20% by mass of the active ingredient) | 6.2 parts by mass (active ingredient: 1.2 parts by mass) |
| Solid silica (solid silica surface-treated with a silane coupling agent having a methacryloyl group, average particle size: 12.5 nm; dispersion having 40% by mass of the active ingredient) | 1.8 parts by mass (active ingredient: 0.7 parts by mass) |
| Silicone-based leveling agent (manufactured by Shin-Etsu Chemical Co., Ltd., trade name "KP-420") | 0.08 parts by mass |
| Diluting solvent (68:32 mixed solvent of methyl isobutyl ketone and 1-methoxy-2-propyl acetate) | 91.3 parts by mass |

TABLE 1

| | Example 1-1 | Example 1-2 | Example 1-3 | Comparative Example 1-1 | Comparative Example 1-2 | Comparative Example 1-3 |
|---|---|---|---|---|---|---|
| Transfer system | Present invention | Present invention | Present invention | Conventional system | Conventional system | Conventional system |
| Type of antifouling agent | Fluorine-based | Silicone-based | Fluorine + silicone-based | Fluorine-based | Silicone-based | Fluorine + silicone-based |
| Water contact angle (degrees) | 99.0 | 90.0 | 105.0 | 72.0 | 79.0 | 73.0 |
| Antifouling properties | B | A | A | C | C | C |

As is evident from the results of Table 1, the molded bodies of Examples 1-1 to 1-3 can be confirmed to have a high water contact angle and favorable antifouling properties. Since the molded bodies of Examples 1-1 to 1-3 and the molded bodies of Comparative Examples 1-1 to 1-3 have the same formulations of the functional layers, respectively, the results of Table 1 support the functional layers (antifouling low refractive index layers) of the molded bodies of Example 2-2

Transfer sheet A, transfer sheet B and a molded body of Example 2-2 were obtained in the same manner as in Example 2-1 except that "0.6 parts by mass of the ultraviolet ray-curable resin" in the coating liquid D for forming an antifouling low refractive index layer was changed to "0.6 parts by mass of an 80:20 mixture of ultraviolet ray-curable resin a and ultraviolet ray-curable resin b given below". The low refractive index layer of Example 2-1 had a refractive index of 1.33.

Ultraviolet ray-curable resin a (polyethylene glycol (n≈4) diacrylate, manufactured by Toagosei Co., Ltd., trade name "M-240")

Ultraviolet ray-curable resin b (pentaerythritol (tri/tetra) acrylate, manufactured by Nippon Kayaku Co., Ltd., trade name "KAYARAD PET-30")

3-2. Surface Roughness

The molded bodies of Examples 2-1 and 2-2 prepared in the section 3-1 were each cut into 5 cm×5 cm to prepare a sample. The profile of the molded body sample was measured by use of an atomic force microscope (AFM) SPM-9600 manufactured by Shimadzu Corporation in an On-Line (measurement) mode in software: SPM manager. The measurement conditions are shown below. Thereafter, a gradient correction treatment was performed with an Off-Line (analysis) mode, and a gradation image was obtained where a height of 0 nm corresponded to black and a height of 100 nm or more corresponded to white. The lowest point in the measurement area was defined as "a height of 0 nm". The resulting AFM image was analyzed, and Rz (maximum height roughness) and Ra (arithmetic average roughness) of each sample were obtained. The respective average values of Rz and Rz/Ra at 14 points with respect to each sample were evaluated. The results are shown in Table 2.

<AFM Measurement Conditions>
  Measurement mode: phase
  Scanning range: 5 μm×5 μm
  Scanning rate: 0.8 to 1 Hz
  Number of pixels: 512×512
  Cantilever used: NCHR manufactured by NanoWorld AG (resonant frequency: 320 kHz, spring constant 42 N/m)
  <AFM Analysis Conditions>
  Gradient correction: line fitting 3-3. Oil Dust Resistance Test The molded bodies of Examples 1-1 to 1-3, 2-1 and 2-2 were each cut into 5 cm×5 cm to prepare a sample. A test liquid was prepared by mixing AC dust (ISO12103-1, A2 (Fine)) and olive oil (CAS No. 8001-25-0) at 1/1 (weight ratio).

A waste cloth (trade name "Aspure Proprea II" manufactured by AS ONE Corporation) was folded into eight-ply, and firmly attached to a tip of a rod-shaped metal member (the shape of a rod-shaped end surface was a 1 cm square) by a rubber band. A side of the rod-shaped metal member to which the waste cloth was attached was immersed in the test liquid, an end surface of the waste cloth was evenly impregnated with 5 g of the test liquid, and thus a rod-shaped metal member for rubbing was obtained.

The sample was adhered to a test stand so that the antifouling low refractive index layer served as an upper surface. A weight was attached to the rod-shaped metal member for rubbing, a side of the rod-shaped metal member to which the waste cloth was attached was contacted with the antifouling low refractive index layer surface, and the weight was stroked ten times at a moving speed of 100 mm/sec and a moving distance per stroke of 200 mm (one-way moving distance 100 mm). The contact area of the waste cloth with the low refractive index layer was about 1 cm$^2$ approximately equal to the area of an end surface of the rod-shaped metal member. A test environment was here at a temperature of 23° C.±1° C. and a relative humidity of 50%±5%, unless particularly denoted.

Thereafter, the sample was observed with the naked eye under a fluorescent lamp (model number: FHF32EX—N—H, a three band fluorescent lamp manufactured by Panasonic Corporation, the illuminance on the sample was 800 to 1200 Lx, observation distance 30 cm) and under an LED illumination (LED light manufactured by Gentos Co., Ltd., model number: TX-850Re, the illuminance on each sample was 4000 to 6000 Lx, observation distance 30 cm) from the antifouling low refractive index layer side, and the number of scratches was evaluated. The load was represented as the weight and the oil dust resistance was represented as the maximum load (g/cm$^2$) per unit area in no observation of scratches (zero scratches) after the test observation. Each test was performed at n=2, and the average was defined as the oil dust resistance in each of Examples. The results are shown in Table 2.

3-4. Antifouling Properties (Fingerprint Wiping-Off Properties)

The molded bodies of Examples 1-1 to 1-3, 2-1 and 2-2 were each cut into 5 cm×5 cm to prepare a sample. The antifouling low refractive index layer surface of the sample was pressed by a ball of a finger, and a fingerprint was marked onto the surface. Thereafter, the marked fingerprint was wiped off by a non-woven cloth (trade name: Bemcot manufactured by Asahi Kasei Corporation), and the number of wiping-off operations until no trace of the fingerprint was observed was evaluated.

A case where no trace of the fingerprint was observed by three or less of wiping-off operations was designated as "A", a case where no trace of the fingerprint was observed by 4 to 7 of wiping-off operations was designated as "B", and a case where the fingerprint was observed even after wiping-off was performed seven times was designated as "C". The results are shown in Table 2.

TABLE 2

| | | Example 1-1 | Example 1-2 | Example 1-3 | Example 2-1 | Example 2-2 |
|---|---|---|---|---|---|---|
| Surface roughness | Ra (nm) | — | — | — | 6.03 | 6.23 |
| | Rz (nm) | — | — | — | 50.47 | 66.24 |
| | Rz/Ra | — | — | — | 8.37 | 10.63 |
| Oil dust resistance (g/cm$^2$) | Under fluorescent lamp | 500 | 600 | 500 | 1500 | 750 |
| | Under LED | ≤100 | ≤100 | ≤100 | 1000 | 450 |
| Antifouling properties (fingerprint wiping-off properties) | | B | A | A | A | A |

When Examples 1-1 to 1-3 were compared with Examples 2-1 and 2-2, the oil dust resistance was more favorable in Examples 2-1 and 2-2. This is presumably because the low refractive index layers of Examples 2-1 and 2-2 contained hollow silica and solid silica uniformly dispersed therein as shown in FIG. 6 and the surface profile of the low refractive index layer was not rough, whereas the low refractive index layers of Examples 1-1 to 1-3 contained hollow silica and solid silica not uniformly dispersed therein as shown in FIG. 7 and the surface profile of the low refractive index layer was rough.

4. Evaluation and Measurement on Peel Strength

The transfer sheets obtained in Examples 3-1 to 3-5 and Comparative Example 3-1 described below were measured and evaluated in the following manners. The results are shown in Table 3. The atmosphere in each measurement and each evaluation was at a temperature of 23° C.±5° C. and a humidity of 40 to 65%.

4-1. Peel Strength

A peel strength 1 between the release substrate 1 and the transfer layer and a peel strength 2 between the release substrate 2 and the transfer layer were measured as to the release sheets A obtained in Examples 3-1 to 3-5 and Comparative Example 3-1 in accordance to the 180-degree peel test of JIS Z0237:2009. In Examples 3-1 to 3-5 and Comparative Example 3-1, the peel strength 1 and the peel strength 2 were measured three times, and average values therefrom were used as peel strength 1 and peel strength 2 of Examples 3-1 to 3-5 and Comparative Example 3-1. Sample conditions and measurement conditions were set as described below.

<Sample Conditions for Measurement of Peel Strength 1>

A laminate is prepared in which a transfer layer is formed on a release substrate 1 (a form in which a release substrate 2 is laminated on the transfer layer of the laminate corresponds to transfer sheet A). The laminate is cut into 25 mm in width×150 mm in length. A substrate with double-faced tape is prepared in which a 150 mm long cut piece of double-faced tape (751B, manufactured by Teraoka Seisakusho Co., Ltd.) having a strong pressure-adhesive power is adhered onto a metal rule (Straight Rule Silver TSU-30N, manufactured by Trusco Nakayama Corp.; the same one was used below). The surface of the substrate with double-faced tape on the double-faced tape side is opposed to the surface of the cut laminate on the transfer layer side, and adhered thereto under a load of 2 kg/cm². The release substrate 1 was peeled by 10 to 20 mm from the end portion and used as a sample for measurement of the peel strength 1 in Examples 3-1 to 3-5 and Comparative Example 3-1.

Sample Conditions for Measurement of Peel Strength 2-1—(Examples 3-1 to 3-5)

The transfer sheet A is left on a flat desk for 24 hours such that the release substrate 2 side is turned up (an atmosphere in which the transfer sheet is left is at a temperature of 23° C.±5° C. and a humidity of 40 to 65%). Subsequently, the release substrate 1 is peeled from the transfer sheet A, which is then cut into a size of 25 mm in width×150 mm in length. The surface of the substrate with double-faced tape on the double-faced tape side is opposed to the surface of the cut transfer sheet on the transfer layer side, and adhered thereto under a load of 2 kg/cm². The release substrate 2 was peeled by 10 to 20 mm from the end portion and used as a sample for measurement of the peel strength 2 in Examples 3-1 to 3-5.

Sample Conditions for Measurement of Peel Strength 2-2—(Comparative Example 3-1)

The transfer sheet A is left on a flat desk for 24 hours such that the release substrate 2 side is turned up (an atmosphere in which the transfer sheet is left is at a temperature of 23° C.±5° C. and a humidity of 40 to 65%). Subsequently, the transfer sheet A is cut into a size of 25 mm in width×150 mm in length. The surface of the substrate with double-faced tape on the double-faced tape side is opposed to the surface of the cut transfer sheet A on the release substrate 1 side, and adhered thereto under a load of 2 kg/cm². The release substrate 2 was peeled by 10 to 20 mm from the end portion and used as a sample for measurement of the peel strength 2 in Comparative Example 3-1.

<Measurement Conditions>

Using TENSILON universal tester (RTC-1310A, manufactured by Orientec Co., Ltd.), the adherend (metal rule) of the prepared sample for measurement is fixed to one of the chucking jigs included in the TENSILON universal tester, and the other chucking jig is fixed to the peeled end portion of the release substrate 1 or 2, and set such that the sample is pulled in the longitudinal direction of the release substrate 1 or 2. Then, the transfer sheet is pulled by 70 mm in the direction of a peel angle of 180° C. at room temperature (23° C.) at a peel rate of 300 mm/min, and a load required for peeling is measured. An average load at a moving distance from 10 mm to 30 mm is determined as a peel strength of measuring once, an average value from measurement three times is used as the peel strength.

4-2. Peel Properties of Release Substrate 1

The transfer sheet A is left on a flat desk for 24 hours such that the release substrate 1 side is turned up (an atmosphere in which the transfer sheet is left is at a temperature of 23° C.±5° C. and a humidity of 40 to 65%). Subsequently, the transfer sheet A is cut into a size of 25 mm in width×150 mm in length. The surface of the substrate with double-faced tape on the double-faced tape side is opposed to the surface of the cut transfer sheet A on the release substrate 2 side, and adhered thereto under a load of 2 kg/cm² to prepare a laminate. The peel properties of the release substrate 1 of the laminate were evaluated according to the following criteria.

AA: The release substrate 1 can be stably peeled ahead of the release substrate 2 by a simplified operation, and no local lifting occurs at the interface between the release substrate 2 and the transfer layer.

A: The release substrate 1 can be peeled ahead of the release substrate 2 by a careful operation, and no local lifting occurs at the interface between the release substrate 2 and the transfer layer.

B: Although the release substrate 1 can be peeled ahead of the release substrate 2 by a careful operation, local lifting may occur at the interface between the release substrate 2 and the transfer layer.

C: The release substrate 2 is peeled first even in an attempt to carefully peel only the release substrate 1.

5. Provision of Release Substrate

Substrates i to vii given below were provided as release substrates 1 and 2 for use in Examples 3-1 to 3-5 and Comparative Example 3-1. The substrate i is a plastic film having a release layer, and the substrates ii to vii each have a pressure-sensitive adhesive layer having a weak adhesion power on a plastic film.

Substrate i: trade name "FILMBYNA®" manufactured by Fujimori Kogyo Co., Ltd., part number: 38E-NSD, substrate thickness: 38 μm Substrate ii: trade name "SUNYTECT MS24" manufactured by Sun A Kaken Co., Ltd., substrate thickness: 40 μm Substrate iii: trade name "SUNYTECT YO6F" manufactured by Sun A Kaken Co., Ltd., substrate thickness: 60 μm Substrate iv: trade name "SUNYTECT Y26F" manufactured by Sun A Kaken Co., Ltd., substrate thickness: 60 μm Substrate v: trade name "SAT2038T-JSL" manufactured by Sun A Kaken Co., Ltd., substrate thickness: 60 μm Substrate vi: trade name "R304A" manufactured by Toray Advanced Film Co., Ltd., substrate thickness: 40 μm Substrate vii: trade name "SUNYTECT SAT 1050TRL" manufactured by Sun A Kaken Co., Ltd., substrate thickness: 50 μm 6. Preparation of Transfer Sheet Example 3-1

The coating liquid 1 for forming an adhesive layer was applied onto the release substrate 1 (the aforementioned substrate i) and dried to form an adhesive layer of 2 μm in thickness. Subsequently, the coating liquid 1 for forming a hardcoat layer was applied onto the adhesive layer and dried (70° C., 30 sec) to form a coating film, which was then irradiated with ultraviolet ray from the hardcoat layer side so that the ionizing radiation-curable composition was cured to form a hardcoat layer of 5 μm in thickness. Subsequently, the release substrate 2 (the aforementioned substrate ii) was laminated onto the hardcoat layer to obtain transfer sheet A of Example 3-1. The transfer sheet A of Example 3-1 had the release substrate 1, the adhesive layer, the hardcoat layer and the release substrate 2 in the presented order.

Examples 3-2 to 3-5 and Comparative Example 3-1

Transfer sheets A of Examples 3-2 to 3-5 and Comparative Example 3-1 were obtained in the same manner as in Example 3-1 except that the release substrate 2 was changed as described in Table 3.

TABLE 3

| | Release substrate 1 | Release substrate 2 | Peel strength (mN/25 mm) | | | Peel properties of release substrate 1 |
| --- | --- | --- | --- | --- | --- | --- |
| | | | Peel strength 1 | Peel strength 2 | Peel strength 2 − Peel strength 1 | |
| Example 3-1 | Substrate i | Substrate ii | 62 | 192 | 130 | AA |
| Example 3-2 | | Substrate iii | 62 | 350 | 288 | AA |
| Example 3-3 | | Substrate iv | 62 | 468 | 406 | AA |
| Example 3-4 | | Substrate v | 62 | 105 | 43 | A |
| Example 3-5 | | Substrate vi | 62 | 80 | 18 | B |
| Comparative Example 3-1 | | Substrate vii | 62 | 51 | −11 | C |

As shown in Table 3, the transfer sheets A of Examples 3-1 to 3-5 having a peel strength 2 larger than a peel strength 1 can be confirmed to yield transfer sheet B by peeling the release substrate 1 while the release substrate 2 remains. The orientation in the thickness direction of the functional layer with reference to the adherend of a molded body obtained by the transfer of the transfer layer of the transfer sheet B is the same as that of the functional layer with reference to the release substrate 1 of the transfer sheet A. Thus, the transfer sheets A of Examples 3-1 to 3-5 can sufficiently impart the function of the functional layer, which is unevenly distributed on the surface side, to the adherend.

Although not described in the table, modifications of Examples 3-1 to 3-5 were tested in which the release substrate 1 was changed to a substrate other than the substrate i. As a result, a case where peel strength 2−peel strength 1 was 100 mN/25 mm or more was designated as AA in the evaluation of the peel properties of the release substrate 1, a case where peel strength 2−peel strength 1 is 40 mN/25 mm or more was designated as A in the evaluation of the peel properties of the release substrate 1, and a case where peel strength 2−peel strength 1 is 15 mN/25 mm or more was designated as B in the evaluation of the peel properties of the release substrate 1.

7. Comparison of Performance of Antifouling Low Refractive Index Layer 7-1. Preparation of Transfer Sheet and Molded Body Example 4-1

The coating liquid 1 for forming an adhesive layer was applied onto the release substrate 1 (the aforementioned substrate i (trade name "FILMBYNA®" manufactured by Fujimori Kogyo Co., Ltd., part number: 38E-NSD)) and dried to form an adhesive layer of 2 μm in thickness. Subsequently, the coating liquid 1 for forming a hardcoat layer was applied onto the adhesive layer and dried (70° C., 30 sec) to form a coating film, which was then irradiated with ultraviolet ray from the hardcoat layer side so that the ionizing radiation-curable composition was cured to form a hardcoat layer of 5 μm in thickness. Subsequently, the coating liquid D for forming an antifouling low refractive index layer was applied onto the hardcoat layer, dried (50° C., 60 sec) and irradiated with ultraviolet ray to form an antifouling low refractive index layer of 100 nm in thickness having a refractive index of 1.33. Subsequently, the release substrate 2 (the aforementioned substrate ii, trade name "SUNYTECT MS24" manufactured by Sun A Kaken Co., Ltd.) was laminated onto the antifouling low refractive index layer to obtain a transfer sheet A of Example 4-1. The transfer sheet A of Example 4-1 had the release substrate 1, the adhesive layer, the hardcoat layer, the antifouling low refractive index layer and the release substrate 2 in the presented order.

Subsequently, the release substrate 1 of the obtained transfer sheet A was peeled to obtain a transfer sheet B of Example 4-1.

Subsequently, the surface of the transfer sheet B on the adhesive layer side was put on an adherend (polycarbonate resin plate (manufactured by Sumitomo Bakelite Co., Ltd., trade name "ECK 100UU", thickness: 2 mm)), followed by heat transfer from the release substrate 2 side of the transfer sheet using a roll type hot stamp machine (manufactured by Navitas Machinery Co., Ltd., trade name "RH-300") under conditions involving a roll temperature of 220 to 240° C. and a roll speed of 20 mm/s.

Subsequently, the release substrate 2 of the transfer sheet B was peeled to obtain a molded body of Example 4-1. The molded body of Example 4-1 had the adherend, the adhesive layer, the hardcoat layer and the antifouling low refractive index layer in the presented order.

Example 4-2

Transfer sheet A, transfer sheet B and a molded body of Example 4-2 were obtained in the same manner as in Example 4-1 except that the coating liquid D for forming an antifouling low refractive index layer was changed to coating liquid E for forming an antifouling low refractive index layer given below.

<Coating Liquid E for Forming Antifouling Low Refractive Index Layer>

| | |
|---|---|
| Photopolymerization initiator (manufactured by IGM Resins B.V., trade name "Omnirad 127") | 0.02 parts by mass |
| Ultraviolet ray-curable resin (polyethylene glycol (n ≈ 4) diacrylate, manufactured by Toagosei Co., Ltd., trade name "M-240") | 0.6 parts by mass |
| Hollow silica (hollow silica surface-treated with a silane coupling agent having a methacryloyl group, average particle size: 75 nm; dispersion having 20% by mass of the active ingredient) | 6.2 parts by mass (active ingredient: 1.2 parts by mass) |
| Solid silica (solid silica surface-treated with a silane coupling agent having a methacryloyl group, average particle size: 12.5 nm; dispersion having 40% by mass of the active ingredient) | 1.8 parts by mass (active ingredient: 0.7 parts by mass) |
| Fluorine-based leveling agent (manufactured by Shin-Etsu Chemical Co., Ltd., trade name "X-71-1203M") | 0.08 parts by mass |
| Diluting solvent (68:32 mixed solvent of methyl isobutyl ketone and 1-methoxy-2-propyl acetate) | 91.3 parts by mass |

Example 4-3

Transfer sheet A, transfer sheet B and a molded body of Example 4-3 were obtained in the same manner as in Example 4-1 except that the coating liquid D for forming an antifouling low refractive index layer was changed to coating liquid F for forming an antifouling low refractive index layer given below.

<Coating Liquid F for Forming Antifouling Low Refractive Index Layer>

| | |
|---|---|
| Photopolymerization initiator (manufactured by IGM Resins B.V., trade name "Omnirad 127") | 0.02 parts by mass |
| Ultraviolet ray-curable resin a (pentaerythritol (tri/tetra)acrylate, manufactured by Nippon Kayaku Co., Ltd., trade name "KAYARAD PET-30") | 0.3 parts by mass |
| Ultraviolet ray-curable resin b (dipentaerythritol (hexa/penta)acrylate, manufactured by Nippon Kayaku Co., Ltd., trade name "KAYARAD DPHA") | 0.3 parts by mass |
| Hollow silica (hollow silica surface-treated with a silane coupling agent having a methacryloyl group, average particle size: 75 nm; dispersion having 20% by mass of the active ingredient) | 6.2 parts by mass (active ingredient: 1.2 parts by mass) |
| Solid silica (solid silica surface-treated with a silane coupling agent having a methacryloyl group, average particle size: 12.5 nm; dispersion having 40% by mass of the active ingredient) | 1.8 parts by mass (active ingredient: 0.7 parts by mass) |
| Fluorine-based leveling agent (manufactured by Shin-Etsu Chemical Co., Ltd., trade name "X-71-1203M") | 0.08 parts by mass |
| Diluting solvent (68:32 mixed solvent of methyl isobutyl ketone and 1-methoxy-2-propyl acetate) | 91.3 parts by mass |

Example 4-4

Transfer sheet A, transfer sheet B and a molded body of Example 4-4 were obtained in the same manner as in Example 4-1 except that the coating liquid D for forming an antifouling low refractive index layer was changed to coating liquid G for forming an antifouling low refractive index layer given below.

<Coating Liquid G for Forming Antifouling Low Refractive Index Layer>

| | |
|---|---|
| Photopolymerization initiator (manufactured by IGM Resins B.V., trade name "Omnirad 127") | 0.02 parts by mass |
| Ultraviolet ray-curable resin a (pentaerythritol (tri/tetra)acrylate, manufactured by Nippon Kayaku Co., Ltd., trade name "KAYARAD PET-30") | 0.3 parts by mass |
| Ultraviolet ray-curable resin b (dipentaerythritol (hexa/penta)acrylate, manufactured by Nippon Kayaku Co., Ltd., trade name "KAYARAD DPHA") | 0.3 parts by mass |
| Hollow silica (hollow silica surface-treated with a silane coupling agent having a methacryloyl group, average particle size: 75 nm; dispersion having 20% by mass of the active ingredient) | 6.2 parts by mass (active ingredient: 1.2 parts by mass) |
| Solid silica (solid silica surface-treated with a silane coupling agent having a methacryloyl group, average particle size: 12.5 nm; dispersion having 40% by mass of the active ingredient) | 1.8 parts by mass (active ingredient: 0.7 parts by mass) |
| Silicone-based leveling agent (manufactured by Shin-Etsu Chemical Co., Ltd., trade name "KP-420") | 0.08 parts by mass |
| Diluting solvent (68:32 mixed solvent of methyl isobutyl ketone and 1-methoxy-2-propyl acetate) | 91.3 parts by mass |

Example 4-5

Transfer sheet A, transfer sheet B and a molded body of Example 4-5 were obtained in the same manner as in Example 4-1 except that the coating liquid 1 for forming a hardcoat layer was changed to coating liquid 2 for forming a hardcoat layer given below.

<Coating Liquid 2 for Forming Hardcoat Layer>

| | |
|---|---|
| Ultraviolet ray-curable compound (multifunctional urethane acrylate, manufactured by DIC Corp., trade name: LUXYDIR ERS-543) | 23.7 parts by mass |
| Ultraviolet ray-curable compound (multifunctional urethane acrylate, manufactured by DIC Corp., trade name: LUXYDIR EKS-796) | 18.5 parts by mass |
| Ultraviolet absorber (hydroxyphenyltraizine-based, manufactured by BASF Japan K.K., trade name: Tinuvin 477) | 0.74 parts by mass |

-continued

| | |
|---|---|
| Ultraviolet ray-curable compound (acrylic resin, manufactured by Arakawa Chemical Industries, Ltd., trade name DSR-1) | 1.85 parts by mass |
| Photopolymerization initiator (IGM Resins B.V., trade name "Omnirad 184") | 0.84 parts by mass |
| Acrylic resin particles (average particle size: 2.0 nm) | 5.17 parts by mass |
| Acrylic resin particles (fumed silica, average particle size: 200 nm) | 0.72 parts by mass |
| Silicone-based leveling agent (manufactured by Momentive Performance Materials Inc., trade name: T5F4460) | 0.27 parts by mass |
| Diluting solvent (mixed solution of toluene/IPA = 60/40) | 48.3 parts by mass |

Comparative Example 4-11

Transfer sheet A, transfer sheet B and a molded body of Comparative Example 4-1 were obtained in the same manner as in Example 4-1 except that the release substrate 2 was changed to the substrate vii (trade name "SUNYTECT SAT 1050TRL" manufactured by Sun A Kaken Co., Ltd.).

Since the transfer sheet A of Comparative Example 4-1 has a peel strength 2 smaller than a peel strength 1, the release substrate 1 cannot be peeled ahead of the release substrate 2 by a usual approach. Thus, in Comparative Example 4-1, the peeling of the release substrate 1 was triggered by slitting the transfer sheet A on the release substrate 1 side, and the release substrate 1 was gradually peeled while the transfer sheet A was pressed from both sides so as not to peel the release substrate 2, to obtain a transfer sheet B.

Comparative Example 4-2

The coating liquid D for forming an antifouling low refractive index layer was applied onto the release substrate 1 (the aforementioned substrate i), dried (50° C., 60 sec) and irradiated with ultraviolet ray to form an antifouling low refractive index layer of 100 nm in thickness having a refractive index of 1.33. Subsequently, the coating liquid 1 for forming a hardcoat layer was applied onto the antifouling low refractive index layer and dried (70° C., 30 sec) to form a coating layer, which was then irradiated with ultraviolet ray from the hardcoat layer side so that the ionizing radiation-curable composition was cured to form a hardcoat layer of 5 μm in thickness. Subsequently, the coating liquid 1 for forming an adhesive layer was applied onto the hardcoat layer and dried to form an adhesive layer of 2 μm in thickness. In this way, a transfer sheet of Comparative Example 4-2 was obtained. The transfer sheet of Comparative Example 4-2 had the release substrate 1, the antifouling low refractive index layer, the hardcoat layer and the adhesive layer in the presented order.

Subsequently, the surface of the transfer sheet on the adhesive layer side was put on an adherend (polycarbonate resin plate (manufactured by Sumitomo Bakelite Co., Ltd., trade name "ECK 100UU", thickness: 2 mm)), followed by heat transfer from the release substrate 1 side of the transfer sheet using a roll type hot stamp machine (manufactured by Navitas Machinery Co., Ltd., trade name "RH-300") under conditions involving a roll temperature of 220 to 240° C. and a roll speed of 20 mm/s.

Subsequently, the release substrate 1 of the transfer sheet was peeled to obtain a molded body of Comparative Example 4-2. The molded body of Comparative Example 4-2 had the adherend, the adhesive layer, the hardcoat layer and the antifouling low refractive index layer in the presented order.

Reference Example 4-1

Transfer sheet A, transfer sheet B and a molded body of Reference Example 4-1 were obtained in the same manner as in Example 4-1 except that the release substrate 2 was changed to the substrate iv (trade name "SUNYTECT Y26F" manufactured by Sun A Kaken Co., Ltd.).

7-2. Measurement and Evaluation

The molded bodies, etc. of Examples 4-1 to 4-5, Comparative Examples 4-1 to 4-2 and Reference Example 4-1 were measured and evaluated in the following manners. The atmosphere in each measurement and each evaluation was at a temperature of 23° C.±5° C. and a humidity of 40 to 65%, unless otherwise specified. A molded body, etc. was exposed to the atmosphere for 30 minutes or more before the start of each measurement and each evaluation, and then subjected to each measurement and each evaluation, unless otherwise specified. The results are shown in Table 4.

(1) XPS Analysis

Each measurement piece was cut out from each of the molded bodies of Examples. X-ray photoelectron spectrums of a C1s orbital, an O1s orbital, an Si2p orbital, and an F1s orbital of the low refractive index layer surface of each measurement piece were measured in the following conditions by use of an X-ray photoelectron spectrometer. Peak separation was performed with respect to each X-ray photoelectron spectrum, and the ratios of C element, O element, F element and Si element were determined. X-ray photoelectron spectra of Si2p orbitals were separated into a peak of inorganic components (silica) and a peak of organic components (silicone) to determine the ratio of Si elements ("inorganic Si" in the Table) attributed to silica particles (hollow silica particles and non-hollow silica particles). Measurement was performed at 14 points for each of measurement pieces, and further analysis was conducted with a number of measurement pieces of n=2. The resulting average was defined as the element ratio in each of Examples and Comparative Examples. The ratio of C element under the assumption that the ratio of Si element attributed to the silica particles was defined to be 100 atomic percent (C/Si) was calculated from the resulting element ratio. In Table 1 and Table 2, any element, such as an O element, other than a Si element (inorganic Si element) derived from an inorganic component, a C element, and an F element was defined as "other element" and the total element ratio was represented.

<Measurement>

Apparatus: AXIS-NOVA manufactured by Kratos Analytical
X-ray source: AlKα
Output of X-ray: 150 W
Emission current: 10 mA
Acceleration voltage: 15 kV
Measurement region: 300×700 μm (2) Surface Roughness The molded bodies of Examples were each cut into 5 cm×5 cm to prepare a sample for measurement. Rz (maximum height roughness) and Ra(arithmetic average roughness) were measured by the same approach as in the section 3-2 using the sample for measurement.

(3) Reflectance (Luminous Reflectance Y Value)

A black plate (trade name: Comoglas DFA2CG 502K (black) type manufactured by Kuraray Co., Ltd., thickness 2 mm) was adhered to the adherend side of each of the molded bodies of Examples, Comparative Examples and Reference Example through a transparent pressure-sensitive adhesive layer having a thickness of 25 µm (trade name: Panaclean PD-S1 manufactured by Panac Co., Ltd.), to thereby prepare a sample (5 cm×5 cm).

Light was incident on the sample from a direction of 5 degrees when the direction perpendicular to the surface of the low refractive index layer of the sample was set at 0 degrees, and the reflectance (luminous reflectance Y value) of the sample was measured based on regular reflection of incident light.

The reflectance was determined as a value representing a luminous reflectance obtained by performing measurement by use of a spectral reflectometer (trade name: UV-2450 manufactured by Shimadzu Corporation) in conditions of a viewing angle of 2 degrees, a C light source, and a wavelength range of from 380 to 780 nm, and thereafter performing calculation by software (UVPC color measurement Version 3.12 built in apparatus) for conversion into brightness sensed by human eyes.

A case where the luminous reflectance Y value was 0.2% or less was designated as "AA", a case of being 0.4% or less was designated as "A", a case of being more than 0.4% and 0.7% or less was designated as "B", and a case of being more than 0.7% and 2.0% or less was designated as "B'".

(4) Water Contact Angle 1.0 µL of pure water was added dropwise to the surface of each of the molded bodies of Examples, Comparative Examples and Reference Example (the surface of the antifouling low refractive index layer), and a static contact angle was measured according to the θ/2 method 10 seconds after dropwise addition. The measurement was performed three times, and an average value therefrom was regarded as a water contact angle. The measurement apparatus used was a contact angle meter from Kyowa Interface Science Co., Ltd. (part number "DM-300").

(5) Antifouling Properties-1—(Oil-Based Pen Writability and Erasability)

An A4 white mount was placed on a flat table, and four sides of the 10×10 cm cut sample of the molded body in the aforementioned section 7-1 were fixed on the mount with mending tape (manufactured by 3M Company, trade name "810-3-18") such that the antifouling low refractive index layer surface was turned up. Subsequently, three lines of 5 mm or more in width and 5 cm in length were written at 2 cm intervals on the antifouling low refractive index layer surface with a black oil-based pen (trade name "Hi-Mckee", manufactured by Zebra Co., Ltd., part number MO-150-MC) on the boldface side, and then erased. Writability and erasability were evaluated according to the criteria described below. As comprehensive evaluation of writability and erasability, antifouling properties were evaluated according to the criteria described below.

<Writability>

After a lapse of 30 seconds from writing, whether or not the three lines were repelled was visually observed. When two or more of the three lines were repelled, the pen was evaluated as being repelled. When the line failed to maintain its shape and was thus deformed or the line width or length shrunk, the pen was regarded as being repelled.

<Erasability>

Ten seconds after visual evaluation of the writability, the three lines were wiped off with waste cloth (trade name "KimWipes", manufactured by Nippon Paper Crecia Co., Ltd., part number: S-200), and the number of wiping-off operations was evaluated until the black ink of the pen was no longer visible.

<<Antifouling Properties>>

AA: The pen was repelled and was able to be wiped off by one wiping-off operation.

A: The pen was not repelled, but was able to be wiped off by 2 to 3 wiping-off operations.

B: The pen was not repelled, but was able to be wiped off by 4 to 5 wiping-off operations.

C: The pen was neither repelled nor was able to be wiped off even by 5 operations.

(6) Antifouling Properties-2—(Fingerprint Wiping-Off Properties)

The molded bodies of Examples, Comparative Examples and Reference Example were each cut into 5 cm×5 cm to prepare a sample. The fingerprint wiping-off properties were evaluated according to the same approach and evaluation criteria as in the section 3-4 using the sample for measurement. The evaluation criteria are as follows.

A: No trace of the fingerprint is observed by three or less of wiping-off operations.

B: No trace of the fingerprint is observed by 4 to 7 of wiping-off operations.

C: The fingerprint is observed even after wiping-off was performed seven times.

(7) Oil Dust Resistance Test

The molded bodies of Examples, Comparative Examples and Reference Example were each cut into 5 cm×5 cm to prepare a sample. The oil dust resistance was evaluated by the same approach as in the section 3-3 using the sample for measurement.

(8) Peel Strength

The peel strength 1 of each of the transfer sheets of Examples, Comparative Examples and Reference Example was measured by the same approach as in the section 4-1.

The peel strength 2 of each of the transfer sheets of Examples 4-1 to 4-5, Comparative Example 4-1 and Reference Example 4-1 was measured by the same approach as in the section 4-1. However, the samples of Examples 4-1 to 4-5 and Reference Example 4-1 were prepared by the approach of "Sample conditions for measurement of peel strength 2-1-" in the section 4-1, and the sample of Comparative Example 4-1 was prepared by the approach of "Sample conditions for measurement of peel strength 2-2-" in the section 4-1.

(9) Transfer Properties

Workability in preparing the molded bodies from the transfer sheets of Examples, Comparative Examples and Reference Example was evaluated according to the following criteria.

A: Workability in peeling the release substrate is favorable, and the operation of transfer is favorable.

C1: It is difficult to peel the release substrate 1 ahead of the release substrate 2 from the transfer sheet A by a usual operation, and the workability of transfer is poor.

C2: The workability of transfer is poor due to too strong peel strength in peeling the release substrate 2 after adhering the transfer sheet B to the adherend.

TABLE 4

| | Element ratio | | | | | Surface roughness | | | |
|---|---|---|---|---|---|---|---|---|---|
| | Inorganic | | | | | | | | |
| | Si (atomic %) | C (atomic %) | F (atomic %) | Others (atomic %) | C/Si (%) | Rz (nm) | Ra (nm) | Rz/Ra | Y value |
| Example 4-1 | 13.5 | 41.2 | Not detected | 45.3 | 305.2 | 50.47 | 6.03 | 8.37 | A |
| Example 4-2 | 10.8 | 39.8 | 30.8 | 18.6 | 368.5 | 59.81 | 6.12 | 9.77 | AA |
| Example 4-3 | 8.2 | 32.7 | 31.3 | 27.8 | 398.8 | 65.06 | 6.02 | 10.81 | AA |
| Example 4-4 | 9.3 | 42.1 | Not detected | 48.6 | 452.7 | 67.19 | 6.02 | 11.16 | A |
| Example 4-5 | 13.5 | 41.2 | Not detected | 45.3 | 305.2 | 51.36 | 6.00 | 8.56 | B⁻ |
| Comparative Example 4-1 | — | — | — | — | — | — | — | — | B |
| Comparative Example 4-2 | — | — | — | — | — | — | — | — | A |
| Reference Example 4-1 | — | — | — | — | — | — | — | — | B |

| | | | | Oil dust resistance (g/cm$^2$) | | Peel strength (mN/25 mm) | | |
|---|---|---|---|---|---|---|---|---|
| | Contact angle (degrees) | Antifouling properties 1 | Antifouling properties 2 | Under fluorescent lamp | Under LED | Peel strength 1 | Peel strength 2 | Transfer properties |
| Example 4-1 | 102 | AA | A | 1500 | 1000 | 62 | 192 | A |
| Example 4-2 | 113 | AA | A | 800 | 500 | 62 | 200 | A |
| Example 4-3 | 114 | A | A | 500 | ≤100 | 62 | 180 | A |
| Example 4-4 | 101 | B | A | 600 | ≤100 | 62 | 200 | A |
| Example 4-5 | 101 | AA | A | 1200 | 800 | 70 | 250 | A |
| Comparative Example 4-1 | 101 | A | B | 600 | ≤100 | 62 | 50 | C1 |
| Comparative Example 4-2 | 79 | C | C | ≤100 | ≤100 | 62 | — | A |
| Reference Example 4-1 | 92 | C | B | 300 | ≤100 | 62 | 1000 | C2 |

From Table 4, it can be confirmed that the molded bodies of Examples 4-1 to 4-5 can favorably exert the function of the antifouling low refractive index layer. Particularly, the molded bodies of Examples 4-1, 4-2 and 4-5 in which the Si element ratio and C/Si of the antifouling low refractive index layer fall within the aforementioned ranges can be confirmed to have favorable oil dust resistance. In particular, the molded body of Example 4-1 was excellent in oil dust resistance even under LED, a light source for stricter evaluation than the fluorescent lamp, and possessed scratch resistance at the antireflection layer level formed dry process.

(10-1) Preparation of Sample for Evaluation of Glass Texture

The surface of each of the transfer sheets B of Examples 4-1 to 4-4 on the adhesive layer side was put on an adherend (soda glass from Hiraoka Special Glass Mfg. Co., Ltd. (thickness: 1.8 mm, 10 cm square)), followed by heat transfer from the release substrate 2 side of the transfer sheet B using a roll type hot stamp machine (manufactured by Navitas Machinery Co., Ltd., trade name "RH-300") under conditions involving a roll temperature of 220 to 240° C. and a roll speed of 20 mm/s.

Subsequently, the release substrate 2 of the transfer sheet B was peeled to obtain a molded body having glass as the adherend in Examples 4-1 to 4-4. These molded bodies each had the adherend (glass), the adhesive layer, the hardcoat layer and the antifouling low refractive index layer in the presented order.

A molded body having glass as the adherend of Comparative Example 4-3 was obtained in which a commercially available antireflection film with optical adhesive layer (Panac Co., Ltd., trade name: Panaclean DSG-17/PD-C3) was adhered onto an adherend (soda glass from Hiraoka Special Glass Mfg. Co., Ltd. (thickness: 1.8 mm, 10 cm square)). The molded body of Comparative Example 4-3 had the adherend (glass), the adhesive layer (thickness: 25 μm), the substrate (triacetylcellulose film having a thickness of 40 μm), the hardcoat layer and the antireflection layer in the presented order. The reflectance Y value of the molded body of Comparative Example 4-3 was 0.4% or less and was at the grade A level.

(10-2) Evaluation of Glass Texture

The molded bodies prepared in the section 10-1 were each subjected to "action of lightly sliding a ball of a finger on the molded body surface by 5 strokes" and "action of confirming sound by lightly tapping the molded body surface with a nail" to evaluate texture and slipping properties. Specifically, the aforementioned soda glass was used as a standard sample to evaluate whether or not the texture and slipping properties of the molded body were close to those of the standard sample.

The textures of the molded bodies having glass as the adherend of Examples 4-1 to 4-4 were closer to glass texture than that of the molded body having glass as the adherend of Comparative Example 4-3.

The sound with a nail did not differ among the four samples of the molded bodies having glass as the adherend of Examples 4-1 to 4-4. The sliding of a ball of a finger was more favorable in Examples 4-2 and 4-3 than in Examples 4-1 and 4-4. The reflection Y values of Examples 4-2 and 4-3 were 0.2% or less and were thus excellent in particular.

REFERENCE SIGNS LIST

10: Release substrate 1
13: Release substrate
20: Release substrate 2
30: Transfer layer
31: Functional layer 1
32: Functional layer 2
100: Transfer sheet A
200: Transfer sheet B
300: Adherend
400: Laminate C
600: Conventional transfer sheet
800: Molded body

The invention claimed is:

1. A transfer sheet A comprising a first release substrate, a transfer layer and a second release substrate in the presented order and having a second peel strength between the second release substrate and the transfer layer larger than a first peel strength between the first release substrate and the transfer layer, the transfer layer comprising a functional layer that is an antifouling low refractive index layer comprising a binder resin, silica particles and an antifouling agent,
    wherein the antifouling agent in the antifouling low refractive index layer is unevenly distributed on the second release substrate side,
    wherein a ratio of Si element attributed to the silica particles is 10.0 atomic percent or more and 18.0 atomic percent or less, and a ratio of C element under the assumption that the ratio of Si element is defined to be 100 atomic percent is 180 atomic percent or more and 500 atomic percent or less, obtained by analysis of a surface region of the second release substrate side of the antifouling low refractive index layer by X-ray photoelectron spectroscopy, and
    wherein arithmetic average roughness Ra on a surface of the second release substrate side of the antifouling low refractive index layer is 6.00 nm or more and 15 nm or less.

2. The transfer sheet A according to claim 1, wherein the difference between the second peel strength and the first peel strength is 15 mN/25 mm or more and 450 mN/25 mm or less.

3. The transfer sheet A according to claim 1,
    wherein a ratio of a concentration (X2) of the antifouling agent contained in the antifouling low refractive index layer at the interface with the second release substrate to a concentration (X1) of the antifouling agent contained in the antifouling low refractive index layer in the surface on the side opposite to the second release substrate is 10 or more.

4. The transfer sheet A according to claim 1,
    wherein the silica particles comprise hollow silica particles and non-hollow silica particles, and
    when the thickness of the antifouling low refractive index layer is trisected and regions obtained are defined as a first region, a second region and a third region sequentially closer to the first release substrate, a ratio of Si element attributed to the silica particles is 10.0 atomic percent or more and 18.0 atomic percent or less, and a ratio of C element under the assumption that the ratio of Si element is defined to be 100 atomic percent is 180 atomic percent or more and 500 atomic percent or less, obtained by analysis of an arbitrary point in the first region and an arbitrary point in the second region by X-ray photoelectron spectroscopy.

5. A method for manufacturing a transfer sheet, comprising performing the following steps (1) and (2) in order:
    (1) applying a coating liquid for forming a transfer layer onto a first release substrate to form a transfer layer comprising at least one functional layer; and
    (2) laminating a second release substrate onto the transfer layer to obtain a transfer sheet A comprising the first release substrate, the transfer layer and the release substrate 2 in the presented order and having a second peel strength between the second release substrate and the transfer layer larger than a first peel strength between the first release substrate and the transfer layer,
    wherein the transfer layer comprises a functional layer that is an antifouling low refractive index layer comprising a binder resin, silica particles and an antifouling agent, and the antifouling agent in the antifouling low refractive index layer is unevenly distributed on the second release substrate side,
    wherein a ratio of Si element attributed to the silica particles is 10.0 atomic percent or more and 18.0 atomic percent or less, and a ratio of C element under the assumption that the ratio of Si element is defined to be 100 atomic percent is 180 atomic percent or more and 500 atomic percent or less, obtained by analysis of a surface region of the second release substrate side of the antifouling low refractive index layer by X-ray photoelectron spectroscopy, and
    wherein an arithmetic average roughness Ra on a surface of the second release substrate side of the antifouling low refractive index layer is 6.00 nm or more and 15 nm or less.

6. The method for manufacturing a transfer sheet according to claim 5, wherein at least one of the functional layer(s) is an anti-glare layer, an antifouling layer or an antifouling low refractive index layer.

7. The method for manufacturing a transfer sheet according to claim 5, further performing the following step (3):

(3) peeling the first release substrate from the transfer sheet A to obtain a transfer sheet B comprising the transfer layer on the second release substrate.

\* \* \* \* \*